US010219231B2

United States Patent
Stirling-Gallacher et al.

(10) Patent No.: US 10,219,231 B2
(45) Date of Patent: Feb. 26, 2019

(54) SYSTEM AND METHOD FOR BEAMFORMED BROADCAST AND SYNCHRONIZATION SIGNALS IN MASSIVE MULTIPLE INPUT MULTIPLE OUTPUT COMMUNICATIONS SYSTEMS

(71) Applicant: Futurewei Technologies, Inc., Plano, TX (US)

(72) Inventors: Richard Stirling-Gallacher, San Diego, CA (US); Bin Liu, San Diego, CA (US); Majid Ghanbarinejad, Rolling Meadows, IL (US); Qian Cheng, Aurora, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 27 days.

(21) Appl. No.: 15/352,802

(22) Filed: Nov. 16, 2016

(65) Prior Publication Data

US 2018/0035396 A1 Feb. 1, 2018

Related U.S. Application Data

(60) Provisional application No. 62/367,407, filed on Jul. 27, 2016.

(51) Int. Cl.
*H04W 56/00* (2009.01)
*H04B 7/02* (2018.01)
(Continued)

(52) U.S. Cl.
CPC ........ *H04W 56/0005* (2013.01); *H04B 7/028* (2013.01); *H04B 7/0617* (2013.01);
(Continued)

(58) Field of Classification Search
CPC . H04W 56/0005; H04B 7/0617; H04B 7/028; H04H 20/16
(Continued)

(56) References Cited

U.S. PATENT DOCUMENTS

2015/0382370 A1\* 12/2015 Zhang ................... H04L 1/1858
455/450
2016/0087705 A1 3/2016 Guey et al.
(Continued)

FOREIGN PATENT DOCUMENTS

CN 103716081 A 4/2014
CN 105493547 A 4/2016

OTHER PUBLICATIONS

Abu-Surra, et al., "Synchronization Sequence Design for mmWave Cellular Systems", 2014 IEEE 11th Consumer Communications and Networking Conference (CCNC), Jan. 10-13, 2014, pp. 617-622.
(Continued)

*Primary Examiner* — Congvan Tran
(74) *Attorney, Agent, or Firm* — Slater Matsil, LLP

(57) ABSTRACT

A method for transmitting beamformed signals includes beamforming a synchronization signal in accordance with a first set of spatially separated transmission beams, thereby producing first beamformed synchronization signals, transmitting the first beamformed synchronization signals, determining if a first synchronization cycle is complete, and when the first synchronization cycle is not complete, rotating the first set of spatially separated transmission beams, and repeating the beamforming, the transmitting, and the determining until the first synchronization cycle is complete.

13 Claims, 20 Drawing Sheets

(51) Int. Cl.
| | |
|---|---|
| H04B 7/06 | (2006.01) |
| H04H 20/16 | (2008.01) |
| H04W 16/28 | (2009.01) |
| H04W 72/04 | (2009.01) |
| H04W 74/08 | (2009.01) |
| H04W 88/02 | (2009.01) |

(52) U.S. Cl.
CPC .......... *H04H 20/16* (2013.01); *H04W 16/28* (2013.01); *H04W 72/046* (2013.01); *H04W 72/0446* (2013.01); *H04W 74/0833* (2013.01); *H04W 88/02* (2013.01)

(58) Field of Classification Search
USPC .......... 455/450, 456.5–6, 501, 550; 370/311, 370/328–330, 334–335; 375/141, 23, 260
See application file for complete search history.

(56) References Cited

U.S. PATENT DOCUMENTS

| | | | |
|---|---|---|---|
| 2016/0087765 A1* | 3/2016 | Guey | H04L 27/2607 370/330 |
| 2016/0119910 A1 | 4/2016 | Krzymien et al. | |
| 2016/0212631 A1 | 7/2016 | Shen et al. | |
| 2016/0241323 A1* | 8/2016 | Ko | H04B 7/0691 |
| 2016/0373180 A1 | 12/2016 | Guo et al. | |

OTHER PUBLICATIONS

Barati et al., "Directional Cell Discovery in Millimeter Wave Cellular Networks", IEEE Transactions on Wireless Communications, vol. 14, Issue 12, Dec. 2015, pp. 6664-6678.

Desai, et al., "Initial Beamforming for mmWave Communications", 48th Asilomar Conference on Signals, Nov. 2-5, 2014, pp. 1926-1930.

Hou, et al., "A Novel Hybrid Beamforming Transmission Scheme for Common Channels and Signals", 21st Asia-Pacific Conference on Communications (APCC), Oct. 14-16, 2015, pp. 257-261.

Huawei, "Coverage Issues of Massive MIMO in NR", 3GPP TSG RAN WG1 Meeting #85, R1-164372, Agenda Item 7.1.6, Nanjing, China, May 23-27, 2016, 6 pages.

Kim et al., "A Preamble Sequence Design Technique for Efficient Beam ID Detection in Millimeter-Wave Cellular System", IEEE Transactions on Vehicular Technology, vol. PP, Issue 99, Feb. 19, 2016, 7 pages.

Liu et al., "Synchronization & Initial Access for NR", Jun. 8, 2016, 11 pages.

Thomas, et al., "Broadcast Control Strategies for mmWave Massive MIMO Leveraging Orthogonal Basis Functions", Globecom Workshops, Dec. 6-10, 2015, 6 pages.

* cited by examiner

PBCH
(SCHEME 1, 2 OR 3) (TRANSMISSION OF DIFFERENT BEAMS USING TX DIVERSITY, DIFFERENT SUBBANDS OR COMBINATION THEREOF)

PBCH
1ST SET OF BEAMS
- SCHEME 4
(TRANSMISSION USING TX
DIVERSITY OR DIFFERENT
SUBBANDS)

PBCH
2ND SET OF BEAMS
- SCHEME 4
(TRANSMISSION USING TX
DIVERSITY OR DIFFERENT
SUBBANDS)

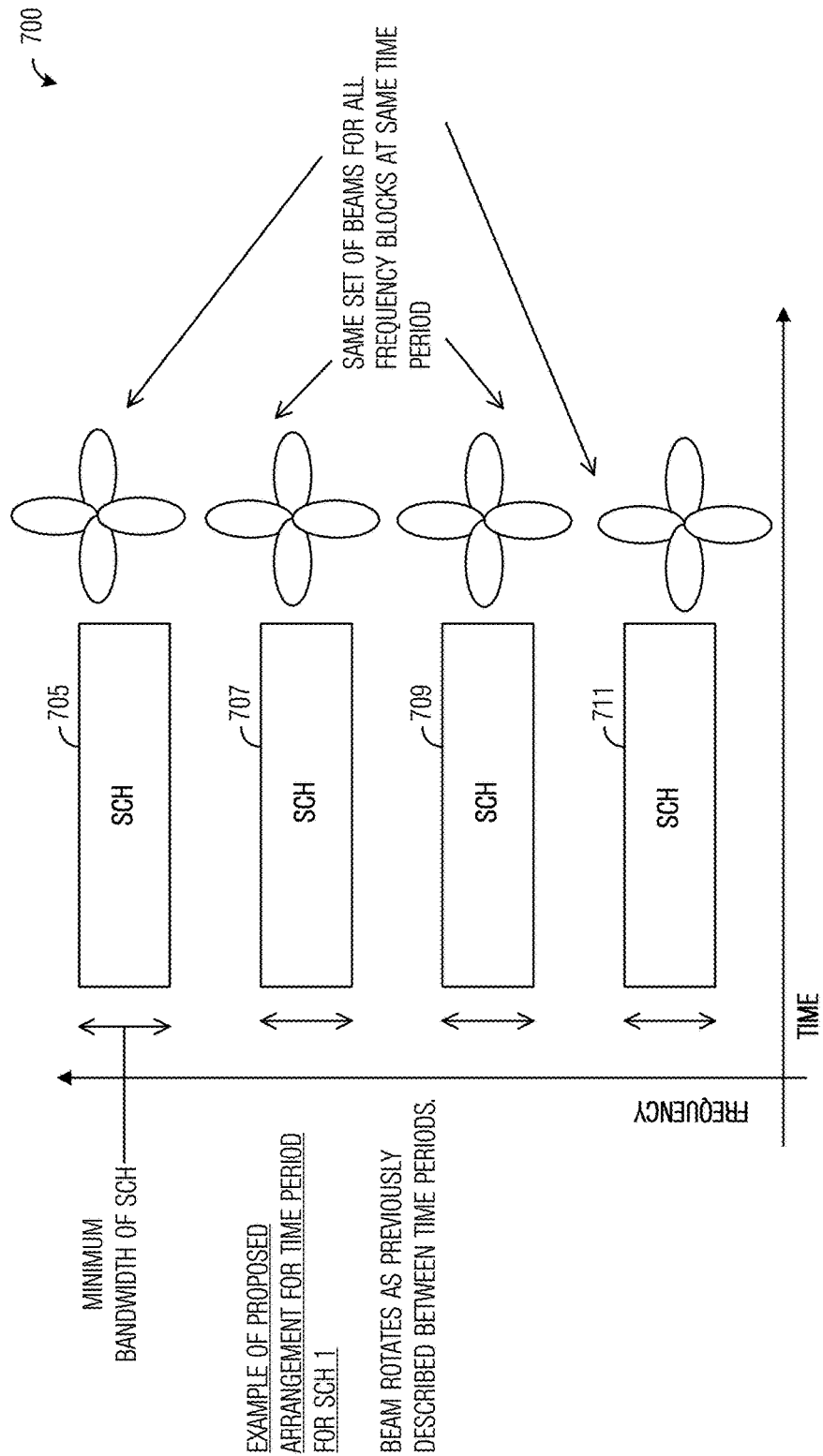

Fig. 10

PBCH
1ST SET OF BEAMS
- SCHEME 4
(TRANSMISSION USING TX DIVERSITY OR DIFFERENT SUBBANDS)
- IF SUBBAND APPROACH IS USED, SAME BEAM DIRECTION OF PBCH AND SCH COULD USE SAME SUBBAND

PBCH
2ND SET OF BEAMS
- SCHEME 4
(TRANSMISSION USING TX DIVERSITY OR DIFFERENT SUBBANDS)
- IF SUBBAND APPROACH IS USED, SAME BEAM DIRECTION OF PBCH AND SCH COULD USE SAME SUBBAND

TIME_2
1015

TIME_4
1025

ID 7, ID 8, ID 11, ID 1005, TIME_3 1020, ID 4, ID 12, ID 3, ID 15, ID 16

SCH 3 (SUBBAND 1)
SCH 4 (SUBBAND 2)

ID 5, ID 6, ID 9, 1005, ID 10, TIME_1 1010, ID 2, ID 1, ID 14, ID 13

SCH 1 (SUBBAND 1)
SCH 2 (SUBBAND 2)

EXAMPLE OF BEAMFORMED SCH MULTIPLEXED IN FREQUENCY AND TIME (N=2), FOLLOWED BY PBCH

- SEQUENCE RELATED TO USED PSS (I.E., SCRAMBLING CODE)
- MAPPED TO $N_{ID}(1)$
- DIFFERENT FOR SLOT 0 & 10
- MAPPED TO BEAM ID (PHASE SHIFT, CYCLIC SHIFT, CODE GROUP MAPPING, ETC)

- SEQUENCE SAME FOR ALL BEAMS FROM ONE TP
- MAPPED TO PHY LAYER IDENTITY $N_{ID}(2)$

SYSTEM AND METHOD FOR BEAMFORMED BROADCAST AND SYNCHRONIZATION SIGNALS IN MASSIVE MULTIPLE INPUT MULTIPLE OUTPUT COMMUNICATIONS SYSTEMS

This application claims the benefit of U.S. Provisional Application No. 62/367,407, filed on Jul. 27, 2016, entitled "A System and Method for Beamformed Broadcast and Synchronization Signals in Massive Multiple Input Multiple Output Communications Systems," which application is hereby incorporated herein by reference.

TECHNICAL FIELD

The present invention relates generally to a system and method for digital communications, and, in particular embodiments, to a system and method for beamformed broadcast and synchronization signals in massive multiple input multiple output (MIMO) communications systems.

BACKGROUND

Beamforming is a technique that makes use of antenna arrays for directional transmission or reception of signals. The elements of the antenna array are combined in such a way that signals in certain directions experience constructive interference while those in other directions experience destructive interference. Communications beam result with enhance performance in certain directions. In cellular communications systems, beamforming is used to improve the link budget for data communications. Examples of cellular communications systems that benefit from beamforming are the systems that operate at frequencies greater than 6 GHz, such as millimeter wave (mmWave) communications systems, as well as massive MIMO communications systems.

However, beamforming is also helpful in improving the link budget for cell specific signals, such as broadcast signals (e.g., physical broadcast signals (PBCH)) and synchronization signals (e.g., primary synchronization signals (PSS) and secondary synchronization signals (SSS)).

SUMMARY

Example embodiments provide a system and method for beamformed broadcast and synchronization signals in massive multiple input multiple output (MIMO) communications systems.

In accordance with an example embodiment, a method for transmitting beamformed signals is provided. The method includes beamforming, by a transmit-receive point (TRP), a synchronization signal in accordance with a first set of spatially separated transmission beams, thereby producing first beamformed synchronization signals, transmitting, by the TRP, the first beamformed synchronization signals, determining, by the TRP, if a first synchronization cycle is complete. When the first synchronization cycle is not complete, the method includes rotating, by the TRP, the first set of spatially separated transmission beams, and repeating, by the TRP, the beamforming, the transmitting, and the determining until the first synchronization cycle is complete.

In accordance with an example embodiment, a method for synchronizing a user equipment (UE) is provided. The method includes determining, by the UE, a first beam identifier associated with a transmission beam conveying a first received beamformed synchronization signal, and determining, by the UE, if a first synchronization cycle is complete. When the first synchronization cycle is not complete, the method includes repeating, by the UE, the determining the first beam identifier, and the determining if the first synchronization cycle is not complete until the first synchronization cycle is complete.

In accordance with an example embodiment, a TRP adapted to transmit beamformed control signals is provided. The TRP includes a processor, and a computer readable storage medium storing programming for execution by the processor. The programming including instructions to configure the TRP to beamform a synchronization signal in accordance with a first set of spatially separated transmission beams, thereby producing first beamformed synchronization signals, transmit the first beamformed synchronization signals, determine if a first synchronization cycle is complete, and when the first synchronization cycle is not complete, rotate the first set of spatially separated transmission beams, and repeat beamforming, transmitting, and determining until the first synchronization cycle is complete.

In accordance with an example embodiment, a UE is provided. The UE includes a processor, and a computer readable storage medium storing programming for execution by the processor. The programming including instructions to configure the UE to determine a first beam identifier associated with a transmission beam conveying a first received beamformed synchronization signal, determine if a first synchronization cycle is complete, and when the first synchronization cycle is not complete, repeat determining the first beam identifier, and determining if the first synchronization cycle is not complete until the first synchronization cycle is complete.

Practice of the foregoing embodiments enables the beamforming of cell specific broadcast signals and synchronization signals with reduced overhead. The reduced overhead enables synchronization in spatial, frequency, and time domains. The reduced overhead also allows for the providing of cell identifier information.

Practice of the foregoing embodiments also accommodate transmit-receive points (TRPs) with different numbers of radio frequency (RF) chains or ability to simultaneously form different numbers of communications beams.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 7 illustrates an example time-frequency plot highlighting the transmission of beamformed synchronization signals in separate frequency blocks according to example embodiments described herein;

FIG. 10 illustrates a fourth example sequence of beamformed transmissions made by a TRP according to example embodiments described herein;

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
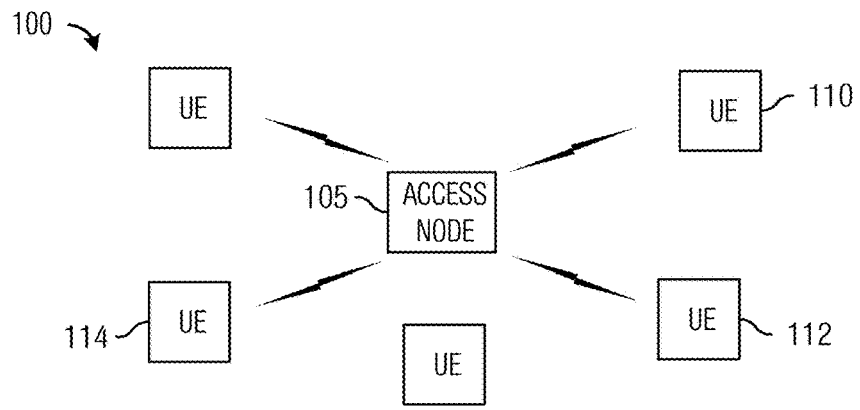
FIG. 1 is an example wireless communications system according to example embodiments described herein.

FIG. 1 illustrates an example wireless communications system 100. Communications system 100 includes an access node 105 serving a plurality of user equipments (UEs), such as UE 110, UE 112, and UE 114. In a first operating mode, transmissions for UEs as well as transmissions by UEs pass through access node 105. Access node 105 allocates network resources for the transmissions to or from the UEs. Access nodes may also be commonly referred to as evolved NodeBs (eNBs), base stations, NodeBs, master eNBs (MeNBs), secondary eNBs (SeNBs), remote radio heads, access points, and the like, while UEs may also be commonly referred to as mobiles, mobile stations, terminals, subscribers, users, stations, and the like. An access node (or an eNB, eNodeB, NodeB, MeNBs, SeNBs, remote radio head, access point, transmission point (TP), transmission and receive point (TRP), base station, and so on) that is serving one or more UEs may be referred to as a serving base station (SBS). A TP may be used to refer to any device capable of transmitting. Therefore, transmission points may refer to access nodes, eNBs, base stations, NodeBs, MeNBs, SeNBs, remote radio heads, access points, UEs, mobiles, mobile stations, terminals, subscribers, users, and the like. A TRP refers to a transmission point that also is capable of receiving.

While it is understood that communications systems may employ multiple access nodes capable of communicating with a number of UEs, only one access node, and 5 UEs are illustrated for simplicity.

A cell is a commonly used term that refers to a coverage area of an access node. Typically, a cell is served by one or more sectors of a sectorized antenna of the access node. Hence, the coverage area of the access node includes a cell partitioned into a plurality of sectors. As an illustrative example, in a scenario where an access node uses a three-sector antenna system, the cell of the access node may be divided into three sectors, with each sector being covered by a separate antenna (with an example beam width of 120 degrees) or a separate part of the total antenna system. As another illustrative example, in a scenario where an access node uses a six-sector antenna system (where each antenna may cover a 60 degree sector, for example), the cell of the access node may be divided into six sectors or three sectors, with each sector being covered by one or two antennas or parts sectors of the antenna system respectively.

Figure 2A:
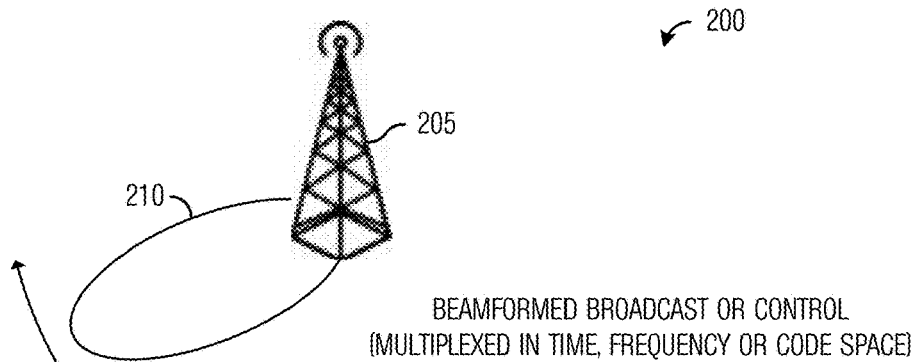
FIG. 2A illustrates a communications system highlighting the transmission of cell specific broadcast signals and synchronization signals using narrow beams according to example embodiments described herein.

A technique for providing beamformed cell specific broadcast signals and synchronization signals involves the transmission of the signals one at a time using narrow beams and then sweeping through available transmission beams. FIG. 2A illustrates a communications system 200 highlighting the transmission of cell specific broadcast signals and synchronization signals using narrow beams. Communications system 200 includes a transmission-reception point (TRP) 205. TRP 205 is transmitting cell specific broadcast signals and synchronization signals in narrow beam 210. TRP 205 transmits the signals using narrow beam 210 for a period of time and changes to a next narrow beam and transmits the signals for another period of time. TRP 205 cycles through all of the narrow beams, transmitting the signals in each narrow beam.

Figure 2B:
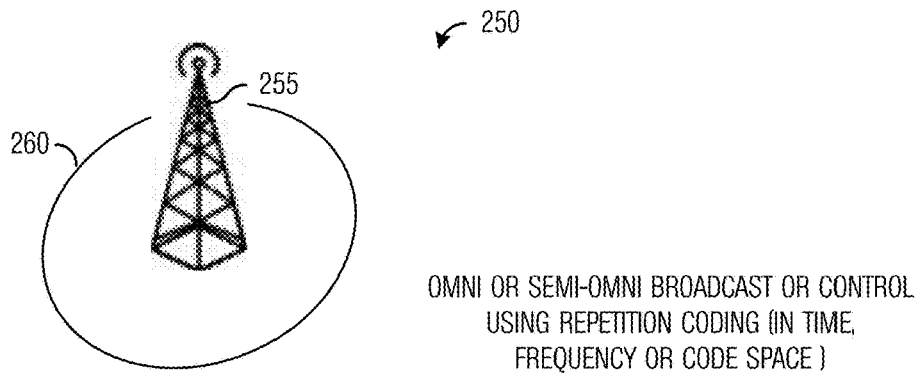
FIG. 2B illustrates a communications system highlighting the transmission of cell specific broadcast signals and synchronization signals using an omni directional beam according to example embodiments described herein.

Another technique involves the transmission of the signals using wider beams with repetition coding. FIG. 2B illustrates a communications system 250 highlighting the transmission of cell specific broadcast signals and synchronization signals using an omni directional beam. Communications system includes a TRP 255. TRP 255 is transmitting cell specific broadcast signals and synchronization signals in omni directional beam 260. Repetition coding (in the time, frequency, or code domain) is used to improve reception performance. Although FIG. 2B illustrates the use of an omni directional beam, smaller beams (referred to as semi-omni directional beams) that are wider than narrow beams may be used. If semi-omni directional beams are used, the TRP cycles through a plurality of semi-omni directional beams to provide full coverage. The use of omni directional or semi-omni directional beams reduce the number of beams the TRP has to use to transmit the signals. In a situation where the environment is changing with time or if the communications system has high phase noise (which generally drifts with time), the use of narrow beams may yield better performance than omni beams.

Figure 3A:
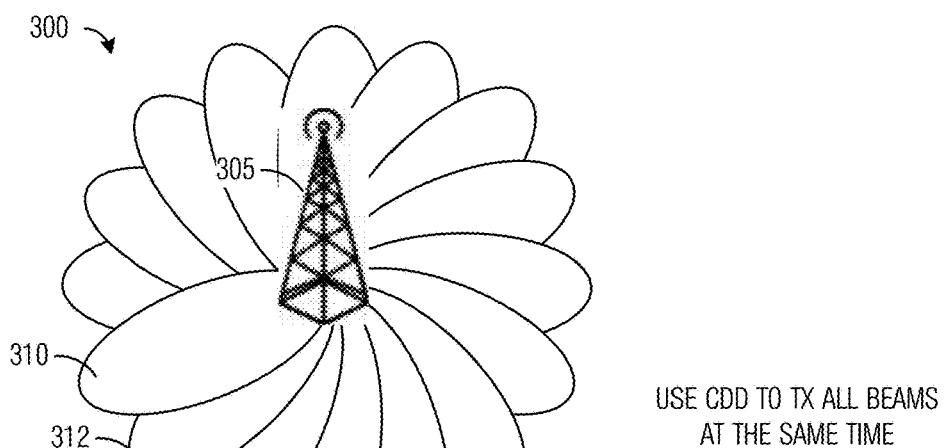
FIG. 3A illustrates a communications system highlighting the simultaneous transmission of beamformed broadcast signals using all available transmission beams according to example embodiments described herein.

A technique used to transmit beamformed broadcast signals, such as physical broadcast channel (PBCH) signals, involves the simultaneous transmission of beamformed broadcast signals using all available transmission beams. A transmit (TX) diversity technique, such as cyclic delay diversity (CDD), is used for the transmission, so that, the same information transmitted on the different beams do not interfere with each other. This technique reduces the overhead (in terms of time, frequency, and code resources) involved in the transmission of the broadcast signals at the TRP, while the UEs inherently reap the benefits of TX diversity. FIG. 3A illustrates a communications system 300 highlighting the simultaneous transmission of beamformed broadcast signals using all available transmission beams. Communications system 300 includes a TRP 305. TRP 305 simultaneously transmits beamformed broadcast signals on all available transmission beams, such as transmission beam 310, transmission beam 312, and transmission beam 314. As shown in FIG. 3A, TRP 305 has a complement of 16 transmission beams. Different TRPs may have different numbers of transmission beams.

In order to utilize TX diversity, each transmission beam has to transmit the same data. Therefore, any beam index information usable in subsequent connection processes is lost. However, loss of beam index information is not an issue in broadcast signals. The TRP has to be able to beamform (or has a sufficient number of RF chains) and transmit the broadcast signals in all of the transmission beams at the same time. Furthermore, due to practical or regulatory restrictions on the maximum TX power (power spectral density, per antenna port, overall spatial TX power, and so on) it may be necessary to reduce the TX power per transmission beam if all beams are used simultaneously and in the same frequency.

Figure 3B:
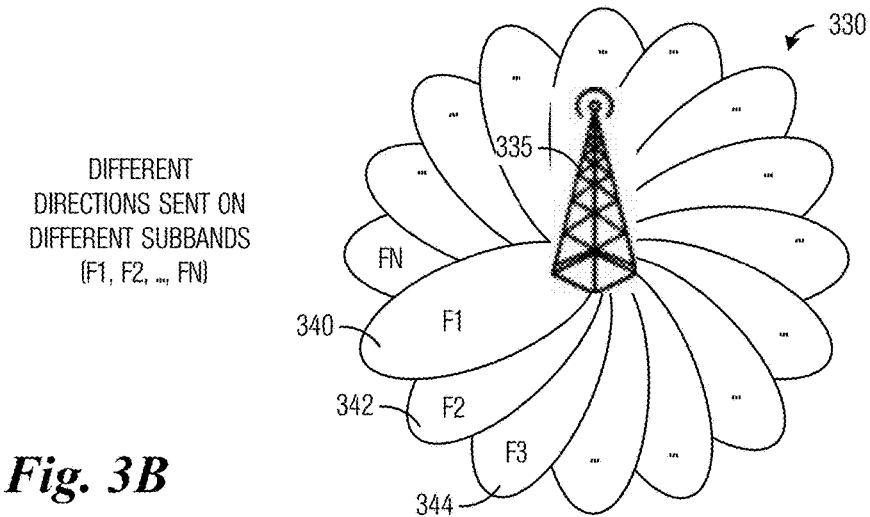
FIG. 3B illustrates a communications system highlighting the transmission of beamformed broadcast signals on different frequency subbands according to example embodiments described herein.

Another technique used to transmit beamformed broadcast signals involves the transmission of beamformed broadcast signals on different frequency subbands. FIG. 3B illustrates a communications system 330 highlighting the transmission of beamformed broadcast signals on different frequency subbands. Communications system 330 includes a TRP 335. TRP 335 transmits beamformed broadcast signals on different frequency subbands with different transmission beams on different subbands. As an example, a first transmission beam 340 is transmitted on subband F1, a second transmission beam 342 is transmitted on subband F2, a third transmission beam 344 is transmitted on subband F3, and so on. Each transmission beam is used in a different subband. The use of different subbands for each transmission beam may alleviate the restriction on maximum TX power (depending on how the maximum power is defined). However, this technique is supported only when digital or hybrid beamforming is used.

Figure 3C:
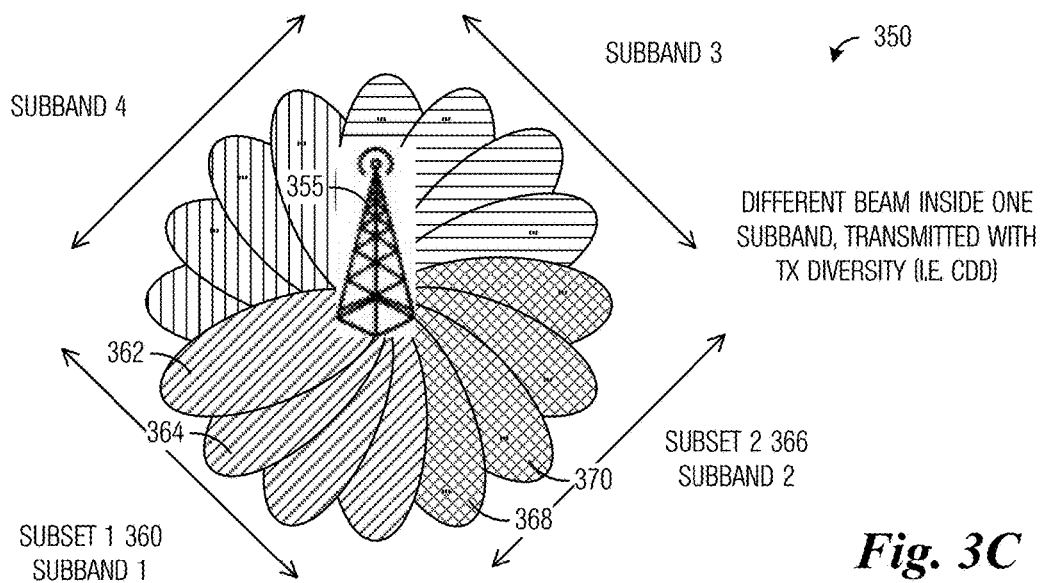
FIG. 3C illustrates a communications system highlighting the transmission of beamformed broadcast signals with a combination of TX diversity and subbands according to example embodiments described herein.

Yet another technique used to transmit beamformed broadcast signals involves the multiplexing of the beamformed broadcast signals with a combination of TX diversity and subbands. FIG. 3C illustrates a communications system 350 highlighting the transmission of beamformed broadcast signals with a combination of TX diversity and subbands. Communications system 350 includes a TRP 355. TRP 355 transmits the beamformed broadcast signals in subsets of available transmission beams with each subset being transmitted in different subbands. As an example, a first subset of transmission beams 360 (including transmission beams 362 and 364) are used to transmit beamformed broadcast signals in a first subband (subband 1), a second subset of transmission beams 366 (including transmission beams 368 and 370) are used to transmit beamformed broadcast signals in a second subband (subband 2), and so on.

According to an example embodiment, cell specific beamformed broadcast channels are transmitted with TX diversity on two or more adjacent transmission beams. The number of adjacent transmission beams may be any number between 2 and a maximum number of transmission beams that a TRP can simultaneously form and transmit. Any form of TX diversity can be used, including CDD.

An additional technique used to transmit beamformed broadcast signals involves the transmission of a subset of the beamformed broadcast signals after a corresponding set of beamformed synchronization signals are transmitted. TX diversity and/or subbands may be used.

In order to facilitate synchronization of the UE with the TRP (where the UE obtains timing information and an initial preferred beam index direction from the TRP), as well as reception of beamformed broadcast signals, a technique is needed with reduced sounding overhead. In some deployments, such as in a heterogeneous deployment with low power mmWave TRPs operating in the coverage area of legacy cells, each TRP may not be required to broadcast control channel information. This is because the broadcast control channel information for the respective TRPs and neighbor TRPs may be provided by the legacy cells.

In a traditional cellular communications system, a high-level procedure where a UE connects with an access node is as follows:

1) The UE obtains downlink synchronization with the access node (using synchronization signals, such as PSS and SSS);

2) The UE demodulates a downlink broadcast channel (e.g., PBCH) transmitted by the access node;

3) The UE initiates a random access procedure by transmitting a random access channel (RACH) signal (e.g., a RACH preamble); If successful, the access node transmits a random access response (RAR) and the access node allocates time and frequency resources to the UE; and 4) The UE demodulates downlink data using assigned downlink control information (DCI) and reference signals.

In a cellular communications system that uses beamformed control and reference signals, a high-level procedure where a UE connects with an access node is as follows:

a) The UE obtains downlink synchronization with the access node (using beamformed synchronization signals, such as beamformed PSS and SSS);

b) The UE demodulates a downlink beamformed broadcast channel (e.g., beamformed PBCH) transmitted by the access node;

c) The UE initiates a random access procedure by transmitting a RACH signal, e.g., a RACH preamble, (which is received with beamforming by the access node); If successful, the access node transmits a RAR and the access node allocates time and frequency resources to the UE;

d) The access node establishes best beam directions for the UE by using feedback corresponding to beamformed channel state information reference signals (CSI-RS) or from sounding reference signals (SRS); and e) The UE demodulates beamformed downlink data using associated beamformed control reference signals.

In communications systems where the signals can easily be blocked by objects (e.g., hands, people, walls, etc.) near the UE, such as mmWave communications systems, the UE may also transmit the RACH signal, e.g., a RACH preamble, using beamforming.

According to an example embodiment, systems and methods for the transmission and reception of cell specific beamformed broadcast and synchronization signals are provided. These systems and methods incur less overhead than existing techniques; therefore, improved performance is realized.

According to an example embodiment, beamformed synchronization signals are simultaneously transmitted on a plurality of spatially separated transmission beams. The transmission beams transmitted together have unique identifiers. The transmission beams are rotated with time, and their identifiers change as the transmission beams are rotated. The rotations occur each symbol time, time slot, or subframe. Deployments where interference between transmission beams (or expected reflections from different transmission beams) is low are good candidates for this example embodiment. Examples of such deployments are communications systems operating in the 60 GHz to 90 GHz range. However, this example embodiment may be used with communications systems operating in other frequency ranges and furthermore, for communications systems wherein the active transmission beams (and/or the sequence or code identifying the different beams) have low cross correlation.

According to an example embodiment, beamformed synchronization signals are simultaneously transmitted by a TRP on a plurality of transmission beams (the active transmission beams) that are spatially separated. Each active transmission beam has a different identifier and is rotated in time. The spatial separation between the transmission beams is maintained between rotations. The plurality of transmission beams is a subset of all transmission beams available at the TRP. The transmission beams in the plurality of transmission beams, as well as the spatial separation between the transmission beams, may be dependent upon the capabilities and configuration of the communications system.

Figure 4:
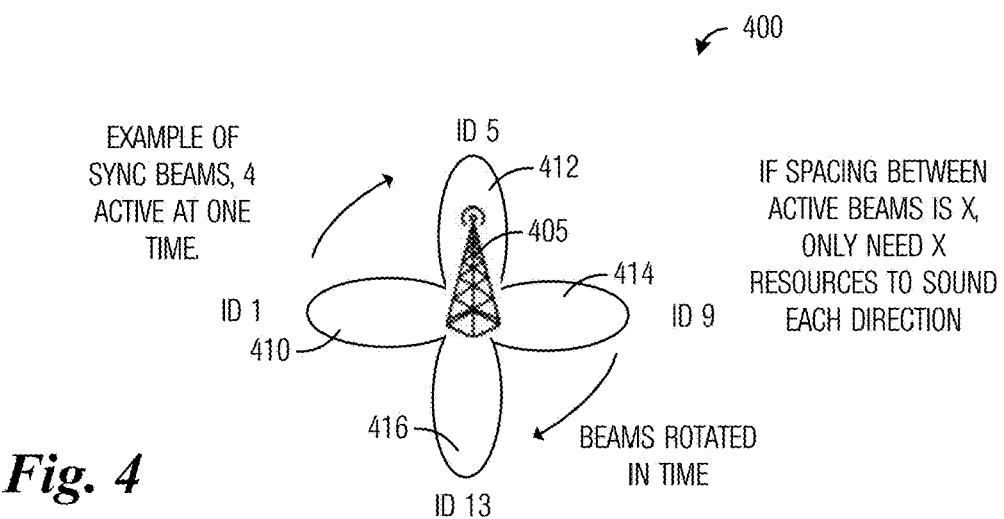
FIG. 4 illustrates a communications system highlighting the simultaneous transmission of beamformed synchronization signals in a plurality of transmission beams that are spatially separated according to example embodiments described herein.

FIG. 4 illustrates a communications system 400 highlighting the simultaneous transmission of beamformed synchronization signals in a plurality of transmission beams that are spatially separated. Communications system 400 includes a TRP 405. For discussion purposes, consider a situation where TRP 405 has a total of 16 transmission beams, each being 20 degrees wide. As shown in FIG. 4, TRP 405 transmits beamformed synchronization signals in 4 transmission beams (transmission beams 410-416) with each transmission beam being spatially separated by 90 degrees. The transmission in the 4 transmission beams occurs for a specified time interval. It is noted that if TRP 405 is capable of beamforming and transmitting more than 4 beams, then the plurality of transmission beams may include more than 4 beams. Similarly, if TRP 405 is incapable of beamforming and transmitting 4 beams, then the plurality of transmission beams includes less than 4 beams (e.g., 2 or 3 beams). Therefore, the discussion of 4 transmission beams should not be construed as being limiting to either the scope or the spirit of the example embodiments.

Each transmission beam has a unique identifier, e.g., transmission beam 410 has identifier ID 1, transmission beam 412 has identifier ID 5, transmission beam 414 has identifier ID 9, and transmission beam 416 has identifier ID 13. The identifier of a transmission beam may be determined by a sequence used in generating the transmission occurring on the transmission beam. After transmitting in the transmission beams 410-416 for the specified amount of time, TRP 405 stops transmitting in the transmission beams 410-416 and rotates to a new plurality of beams. The new plurality of beams has the same number of beams (e.g., 4 beams) and the same spatial separation. However, the transmission beams in the new plurality of beams have different identifiers.

Table 1 illustrates example identifiers of transmission beams for the different rotation numbers for a TRP with a total of 16 transmission beams and 4 active transmission beams at any given time. The beam identifiers are conveyed via the code or sequence transmitted by each transmission beam. The plurality of beams used in transmitting the beamformed synchronization signals may be coordinated with neighboring TRPs. Systems and methods for coordinating the plurality of beams used to transmit the beamformed synchronization signals are presented in detailed in co-assigned U.S. patent application Ser. No. 14/815,571, entitled "System and Method for Beam-Formed Reference/Control Signals," filed Jul. 31, 2015, which is hereby incorporated herein by reference.

TABLE 1

Transmission beam identifiers for different rotations.

| Time (Rotation #) | First Beam ID | Second Beam ID | Third Beam ID | Fourth Beam ID |
|---|---|---|---|---|
| T1 | ID 1 | ID 5 | ID 9 | ID 13 |
| T2 | ID 2 | ID 6 | ID 10 | ID 14 |
| T3 | ID 3 | ID 7 | ID 11 | ID 15 |
| T4 | ID 4 | ID 8 | ID 12 | ID 16 |

Figure 5A:
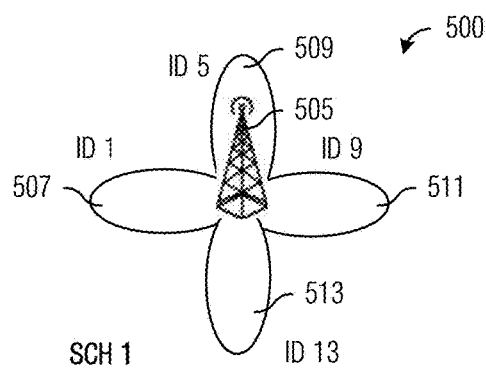
FIGS. 5A-5E illustrate a first example sequence of beamformed signals transmitted by a TRP according to example embodiments described herein.
Figure 5B:
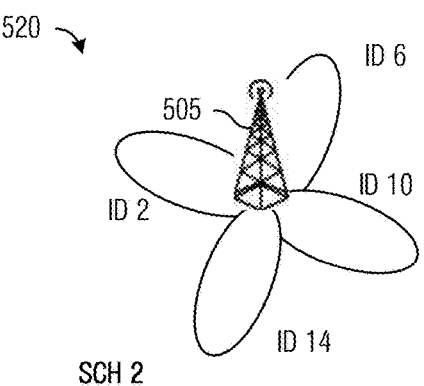

As discussed previously, it may be advantageous to transmit the beamformed broadcast signals using TX diversity. FIGS. 5A-5E illustrate a first example sequence of beamformed signals transmitted by a TRP. FIG. 5A illustrates a diagram 500 of simultaneously transmitted beamformed synchronization signals made by TRP 505 at a first time interval. As shown in FIG. 5A, at the first time interval, TRP 505 simultaneously transmits 4 beamformed synchronization signals on 4 transmission beams that are spatially separated by 90 degrees. A first transmission beam 507 transmits a beamformed synchronization signal with identifier ID 1, a second transmission beam 509 transmits a beamformed synchronization signal with identifier ID 5, a third transmission beam 511 transmits a beamformed synchronization signal with identifier ID 9, and a fourth transmission beam 513 transmits a beamformed synchronization signal with identifier ID 13. The arrangement of transmission beams that are used to simultaneously transmit beamformed synchronization signals is referred to as a set of spatially separated transmission beams. FIG. 5B illustrates a diagram 520 of simultaneously transmitted beamformed synchronization signals made by TRP 505 at a second time interval. As shown in FIG. 5B, at the second time interval, TRP 505 simultaneously transmits 4 beamformed synchronization signals on 4 transmission beams that are spatially separated by 90 degrees, however the 4 transmission beams are rotated by one beam width. In addition to the rotation, the identifiers of the beamformed synchronization signals are also changed.

Figure 5C:
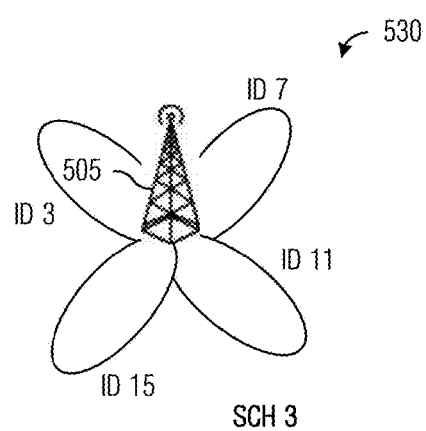
Figure 5D:
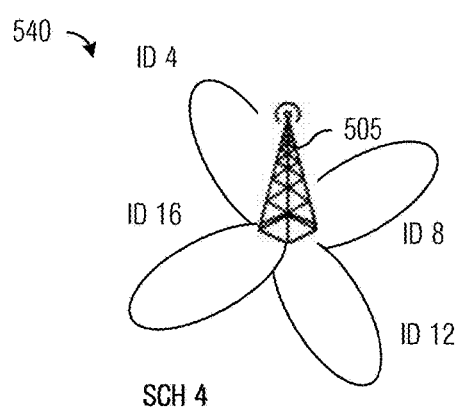

FIG. 5C illustrates a diagram 530 of simultaneously transmitted beamformed synchronization signals made by TRP 505 at a third time interval. As shown in FIG. 5C, at the third time interval, TRP 505 simultaneously transmits 4 beamformed synchronization signals on 4 transmission beams that are spatially separated by 90 degrees with the 4 transmission beams being rotated by another beam. In addition to the rotation, the identifiers of the beamformed synchronization signals are also changed. FIG. 5D illustrates a diagram 540 of simultaneously transmitted beamformed synchronization signals made by TRP 505 at a fourth time interval. As shown in FIG. 5D, at the fourth time interval, TRP 505 simultaneously transmits 4 beamformed synchronization signals on 4 transmission beams that are spatially separated by 90 degrees with the 4 transmission beams being rotated by yet another beam. In addition to the rotation, the identifiers of the beamformed synchronization signals are also changed. It is noted that the same set of spatially separated transmission beams is used in all four time intervals, only differing in identifiers and by rotation. The transmission of the beamformed synchronization signals in four rotations as shown in FIGS. 5A-5D encompasses the full coverage area of TRP 505 and uses all available transmission beams. In other words, after four rotations as shown in FIGS. 5A-5D, TRP 505 has transmitted beamformed synchronization signals using all available transmission beams. If different numbers of transmission beams are available or if a different configuration of transmission beams are used per rotation, then different number of rotations may be needed to fully encompass the full coverage area of TRP 505. Furthermore, each rotation shown in FIGS. 5A-5D involves a rotation amount equal to 1 beam width. Other values for rotation amounts are possible, such as 2 beams, 3 beams, and so forth.

Figure 5E:
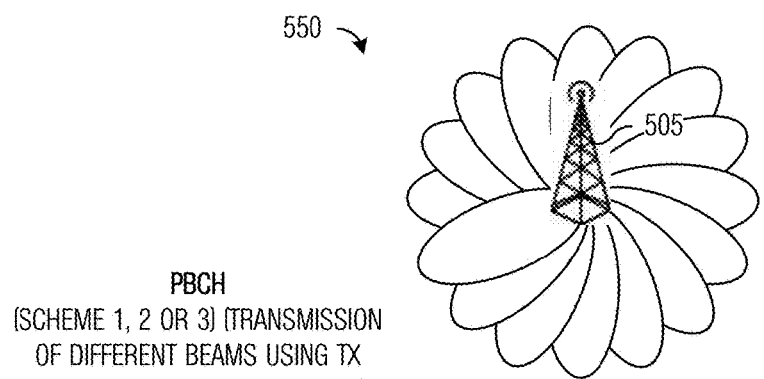

FIG. 5E illustrates a diagram 550 of simultaneously transmitted beamformed broadcast signals made by TRP 505. As shown in FIG. 5E, TRP 505 simultaneously transmits beamformed broadcast signals on all available transmission beams with TX diversity to fully encompass the coverage area of TRP 505. Any of the previously described techniques for transmitting beamformed broadcast signals, such as using different subbands, or a combination of different subbands and TX diversity, etc., may be used. The four transmissions shown in FIGS. 5A-5D make up a synchronization cycle, and the four transmissions shown in FIGS. 5A-5D with the transmission shown in FIG. 5E is referred to as a synchronizing cycle and/or frame structure.

It is noted that although the beamformed broadcast signals are shown in FIG. 5E as being transmitted by TRP 505, in alternative deployments, a different device may be responsible for providing the broadcast information. As an illustrative example, in a heterogeneous deployment, a small cell TRP transmits the beamformed synchronization signals, while a legacy eNB transmits the broadcast signal.

The number of broadcast signals would generally be fixed by the operator of the communications system or technical standard. Depending upon the detected beam identifier, a UE would know the time offset in order to receive the beamformed broadcast signal from the TRP. The configuration shown in FIGS. 5A-5E may be expressed in simplified notation as {SCH(1st rotation), SCH(2nd rotation), SCH(3rd rotation), SCH(4th rotation), PBCH(all)}, Where: SCH beamformed synchronization channels; and
PBCH beamformed broadcast channels.

The sequence of rotations and the relationship between the transmissions of the beamformed synchronization signals and the beamformed broadcast signals illustrated in FIGS. 5A-5E are for illustrative purposes only. Other orderings of the rotations or arrangements of the set of spatially separated transmission beams, as well as the order of beamformed synchronization signals and beamformed broadcast signals are possible. The illustrated set of spatially separated transmission beams, rotations, and relationships should not be construed as being limiting to either the scope or spirit of the example embodiments.

However, some TRPs may not be capable of simultaneously transmitting the beamformed broadcast signals on all transmission beams. According to an example embodiment, in a situation where a TRP is incapable of simultaneously transmitting beamformed broadcast signals on all transmission beams, the TRP may transmit the beamformed broadcast signals on a subset of all transmission beams and rotate the beams in a manner similar to the rotation of the beams discussed in the transmission of the beamformed synchronization signals.

Figure 6A:
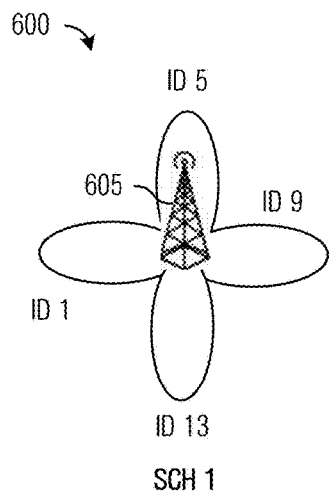
FIGS. 6A-6F illustrate a second example sequence of beamformed signals transmitted by a TRP according to example embodiments described herein.
Figure 6B:
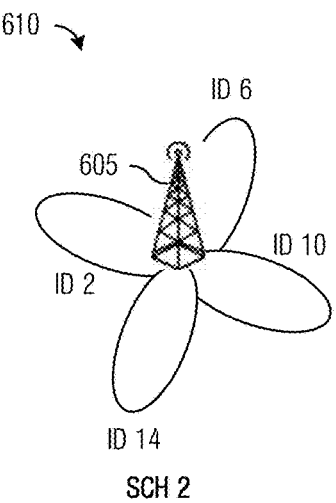

FIGS. 6A-6F illustrate a second example sequence of beamformed signals transmitted by a TRP. FIG. 6A illustrates a diagram 600 of simultaneously transmitted beamformed synchronization signals made by TRP 605 at a first time interval. As shown in FIG. 6A, TRP 605 simultaneously transmits 4 beamformed synchronization signals on a set of spatially separated transmission beams comprising 4 transmission beams that are spatially separated by 90 degrees in a manner similar to what is shown in FIG. 5A. FIG. 6B illustrates a diagram 610 of simultaneously transmitted beamformed synchronization signals made by TRP 605 at a second time. As shown in FIG. 6B, at the second time, TRP 605 simultaneously transmits 4 beamformed synchronization signals on 4 transmission beams that are spatially separated by 90 degrees, however the 4 transmission beams are rotated by one beam width. In addition to the rotation, the identifiers of the beamformed synchronization signals are also changed.

Figure 6C:
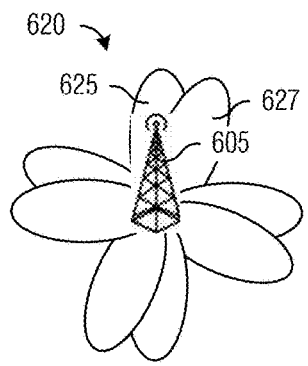

FIG. 6C illustrates a diagram 620 of simultaneously transmitted beamformed broadcast signals made by TRP 605 in a third time interval. Due to limitations of TRP 605, TRP 605 can only simultaneously beamform and transmit beamformed broadcast signals on 8 transmission beams, for example. As shown in FIG. 6C, a set of transmission beams includes 4 groups of 2 adjacent transmission beams with a 90 degree spatial separation between each group. The set of transmission beams used by TRP 605 to transmit the beamformed broadcast signals include the same transmission beams used by TRP 605 to transmit the beamformed synchronization signals in time intervals 1 (FIG. 6A) and 2 (FIG. 6B). As an example, a group of transmission beams comprises transmission beams 625 and 627. TRP 605 may use TX diversity and/or different subbands in the transmission of the beamformed broadcast signals. The three transmissions shown in FIGS. 6A-6C make up a first synchronizing cycle or frame structure, while the two transmissions shown in FIGS. 6A and 6B make up a first synchronization cycle.

Figure 6D:
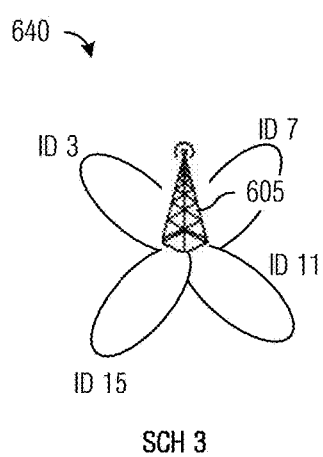
Figure 6E:
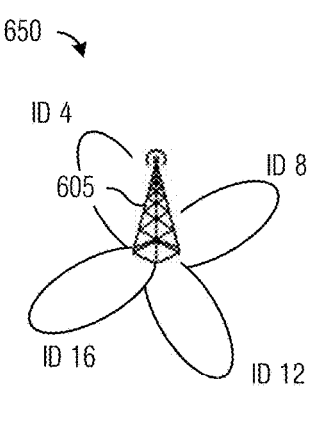

FIG. 6D illustrates a diagram 640 of simultaneously transmitted beamformed synchronization signals made by TRP 605 at a fourth time interval. As shown in FIG. 6D, at the fourth time interval, TRP 605 simultaneously transmits 4 beamformed synchronization signals on 4 transmission beams that are spatially separated by 90 degrees, however the 4 transmission beams are rotated by an additional beam width. In addition to the rotation, the identifiers of the beamformed synchronization signals are also changed. FIG. 6E illustrates a diagram 650 of simultaneously transmitted beamformed synchronization signals made by TRP 605 at a fifth time interval. As shown in FIG. 6E, at the fifth time interval, TRP 605 simultaneously transmits 4 beamformed synchronization signals on 4 transmission beams that are spatially separated by 90 degrees, however the 4 transmission beams are rotated by another beam width. In addition to the rotation, the identifiers of the beamformed synchronization signals are also changed.

Figure 6F:
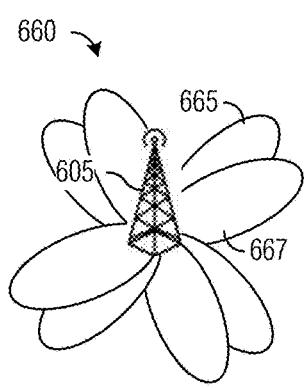

FIG. 6F illustrates a diagram 660 of simultaneously transmitted beamformed broadcast signals made by TRP 605 in a sixth time interval. The set of transmission beams used to transmit the beamformed broadcast signals as shown in FIG. 6F is similar to the set of transmission beams shown in FIG. 6C with exception of a rotation being applied to the set of transmission beams. The set of transmission beams used by TRP 605 to transmit the beamformed broadcast signals include the same transmission beams used by TRP 605 to transmit the beamformed synchronization signals in time intervals 4 (FIG. 6D) and 5 (FIG. 6E). As shown in FIG. 6F, transmission beams 665 and 667 correspond to transmission beams 625 and 627 shown in FIG. 6C. With the particular configuration of transmission beams illustrated in FIGS. 6C and 6F, the rotation is equal to 2 beam widths. The amount of rotation differs based on the total number of transmission beams, the number of transmission beams per group, and the number of sets of transmission beams. The three transmissions shown in FIGS. 6D-6F make up a second synchronizing cycle or frame structure, while the two transmissions shown in FIGS. 6D and 6E make up a second synchronization cycle. The six transmissions shown in FIGS. 6A-6F make up a complete synchronizing cycle or frame structure.

It is noted that although the beamformed broadcast signals are shown in FIGS. 6C and 6F as being transmitted by TRP 605, in alternative deployments, a different device may be responsible for providing the broadcast information. As an illustrative example, in a heterogeneous deployment, a small cell TRP transmits the beamformed synchronization signals, while a legacy eNB transmits the broadcast signals.

The number of beamformed synchronization signals and the number of beamformed synchronization signals to beamformed broadcast signals would generally be fixed by the operator of the communications system or technical standard. Then, depending upon the detected beam identifier, a UE would know the time offset to receive the beamformed broadcast signals. The configuration shown in FIGS. 6A-6F may be expressed in simplified notation as {SCH(1st rotation), SCH(2nd rotation), PBCH(1st+2nd rotations), SCH(3rd rotation), SCH(4th rotation), PBCH(3rd+4th rotations)}, Where: SCH beamformed synchronization channels; and
PBCH beamformed broadcast channels.

The sequence of rotations and the relationship between the transmissions of the beamformed synchronization signals and the beamformed broadcast signals illustrated in FIGS. 6A-6F are for illustrative purposes only. Other orderings of the rotations, as well as the order of beamformed synchronization signals and beamformed broadcast signals are possible. The illustrated rotations and relationships should not be construed as being limiting to either the scope or spirit of the example embodiments.

The example embodiments presented herein enable a reduction in communications overhead by reducing the number of time intervals the beamformed broadcast signals are transmitted. If the beamformed broadcast signals are transmitted every time after the transmission of the beamformed synchronization signals, the resulting overhead would be greater.

In a Third Generation Partnership Project (3GPP) Long Term Evolution (LTE) compliant communications system, synchronization signals (i.e., PSS and SSS) occupy 6 resource blocks (RBs) in the frequency domain with 62 active and 10 guard subcarriers (SCs). Therefore, even the UEs with the lowest RB allocations have access to the synchronization signals. In future new radio (NR) or mmWave communications systems for 3GPP, the minimum bandwidth allocation may be different, so the number of subcarriers for the synchronization signals may also change.

According to an example embodiment, beamformed synchronization signals that are transmitted using wideband RF beamforming are transmitted in separate blocks in the frequency domain. When the beamformed synchronization signals are transmitted in separate blocks in the frequency domain, even the UEs that only have the minimum bandwidth allocation can acquire the beamformed synchronization signals at the same rate as the UEs that have greater bandwidth allocation. However, the UEs with greater bandwidth allocations still have the advantage of lower signal to noise ratio (SNR) due to frequency diversity arising from their greater bandwidth allocation.

FIG. 7 illustrates an example time-frequency plot 700 highlighting the transmission of beamformed synchronization signals in separate frequency blocks. As shown in FIG. 7, beamformed synchronization signals are transmitted in separate frequency blocks, such as frequency blocks 705, 707, 709, and 711. In order to simplify operations, the same transmission beams may be used to transmit the beamformed synchronization signals in the different frequency blocks at the same time interval.

When digital (or hybrid) beamforming is used at a TRP for transmitting beamformed synchronization signals in separate frequency blocks, it may be possible for the TRP to transmit differently rotated beamformed synchronization signals in the frequency domain. The number of frequency blocks in the frequency domain used to transmit the beamformed synchronization signals may need to be limited so that even the most basic UE receiver with the lowest allocated bandwidth is able to derive benefits of the beamformed synchronization signals.

According to an example embodiment, when transmitting beamformed synchronization signals, rotations in the time domain and frequency multiplexing are used to reduce synchronization overhead. It is noted that UEs with limited bandwidth allocations can still utilize such a system when the rotations in the frequency domain cover a limited number of subbands. The application of rotations in the time domain and frequency multiplexing enables TRPs with neighboring transmission beams with potential cross-interference issues to transmit the beamformed synchronization signals at the same time but in different subbands to avoid interference. Additionally, because the different subbands are orthogonal, the number of orthogonal sequences needed is reduced by a factor of N, where N is the number of subbands.

Figure 8:
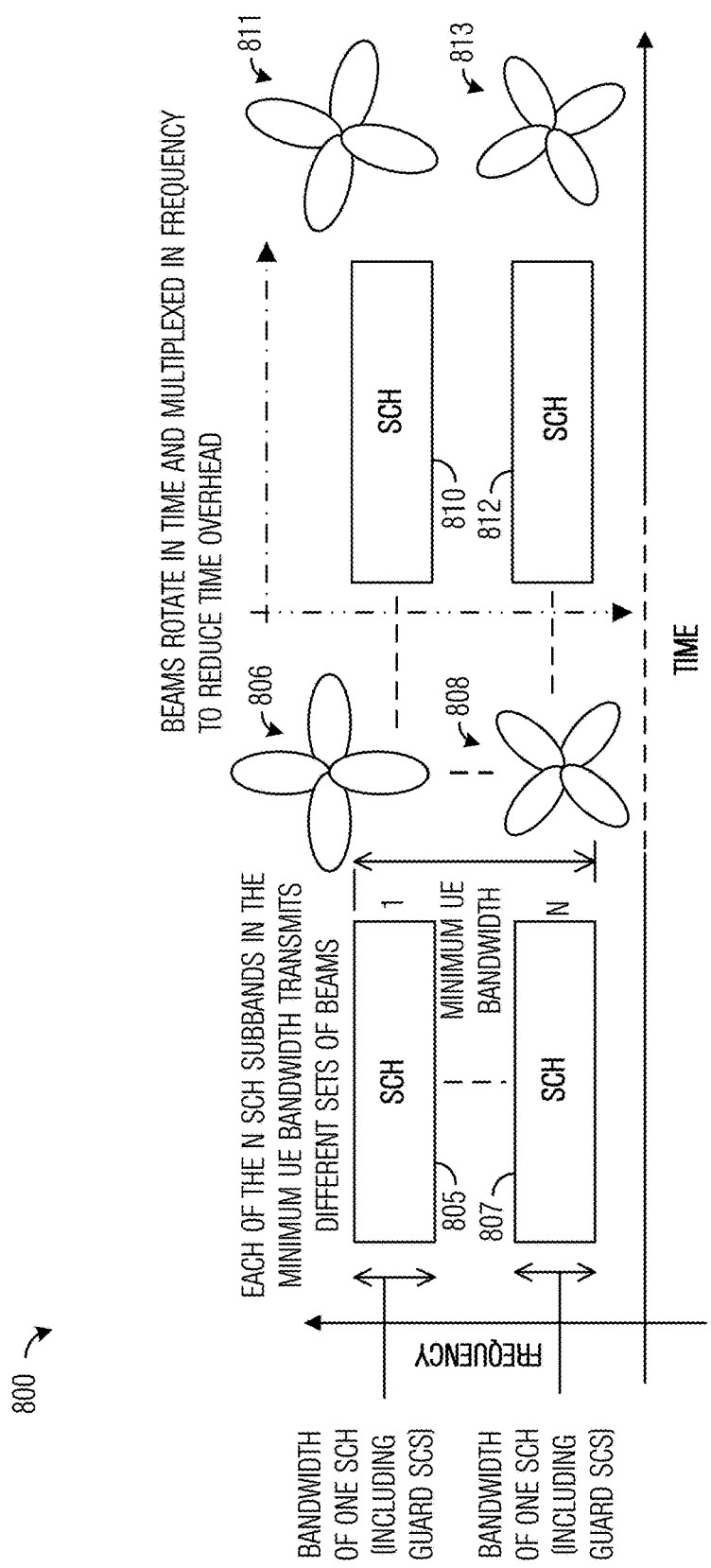
FIG. 8 illustrates an example time-frequency plot highlighting the transmission of beamformed synchronization signals in separate frequency blocks with rotations according to example embodiments described herein.

FIG. 8 illustrates an example time-frequency plot 800 highlighting the transmission of beamformed synchronization signals in separate frequency blocks with rotations. As shown in FIG. 8, frequency blocks, such as frequency blocks 805 and 807, occurring at the first time are used to transmit beamformed synchronization signals with different sets of transmission beams. As shown in FIG. 8, set of transmission beams 806 is used in frequency block 805 and set of transmission beams 808 is used in frequency block 807. Furthermore, at a second time, frequency blocks 810 and 812 are used to transmit synchronization signals with sets of transmission beams 811 and 813, respectively. It is noted that the sets of transmission beams may have the same base set of transmission beams, but with different rotations.

Figure 9:
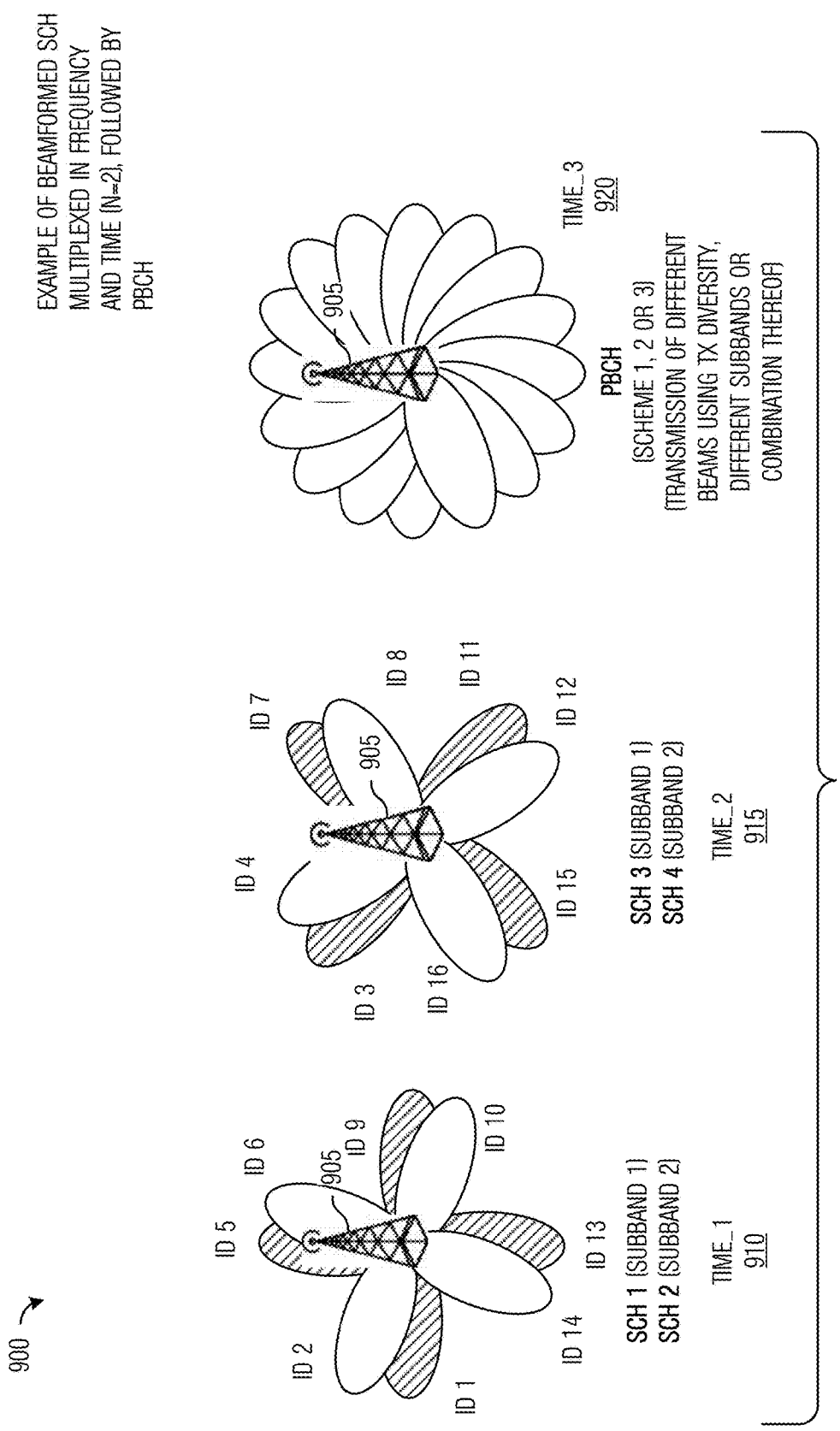
FIG. 9 illustrates a third example sequence of beamformed transmissions made by a TRP according to example embodiments described herein.

FIG. 9 illustrates a third example sequence of beamformed transmissions 900 made by a TRP 905. TRP 905 is transmitting beamformed signals in different frequency blocks with rotations applied at different times. At a first time (time_1) 910, TRP 905 transmits beamformed synchronization signals using a total of 8 transmission beams, with a first set of 4 spatially separated transmission beams (unshaded beams) transmitted in a first subband and a second set of 4 spatially separated transmission beams (crosshatched beams) transmitted in a second subband. Each transmission beam has a different beam identity. At a second time (time_2) 915, TRP 905 transmits beamformed synchronization signals using a total of 8 transmission beams, with a first set of 4 spatially separated transmission beams transmitted in a first subband and a second set of 4 spatially separated transmission beams transmitted in a second subband. The sets of 4 spatially separated transmission beams used in second time 915 are rotated versions of the sets of 4 spatially separated transmission beams used in first time 910. Each transmission beam has a different beam identity. At a third time (time_3) 920, TRP 905 transmits beamformed broadcast signals using a total of 16 transmission beams, which includes all of the transmission beams used to transmit the beamformed synchronization signals in first time 910 and second time 915. Any of the previously described techniques for transmitting beamformed broadcast signals, such as using TX diversity, different subbands, or a combination of different subbands and TX diversity, etc., may be used.

FIG. 10 illustrates a fourth example sequence of beamformed transmissions made by a TRP 1005. TRP 1005 is transmitting beamformed signals in different frequency blocks with rotations. At a first time (time_1) 1010, TRP 1005 transmits beamformed synchronization signals using a total of 8 transmission beams, with a first set of 4 spatially separated transmission beams (unshaded beams) transmitted in a first subband and a second set of 4 spatially separated transmission beams (crosshatched beams) transmitted in a second subband. Each transmission beam has a different beam identity. At a second time (time_2) 1015, TRP 1005 transmits beamformed broadcast signals using 8 transmission beams, the same 8 transmission beams used in first time 1010. Any of the previously described techniques for transmitting beamformed broadcast signals, such as using TX diversity, different subbands, or a combination of different subbands and TX diversity, etc., may be used. At a third time (time_3) 1020, TRP 1005 beamformed synchronization signals using a total of 8 transmission beams, with a first set of 4 spatially separated transmission beams transmitted in a first subband and a second set of 4 spatially separated transmission beams transmitted in a second subband. The sets of 4 spatially separated transmission beams used in third time 1020 are rotated versions of the sets of 4 spatially separated transmission beams used in first time 1010. At a fourth time (time_4) 1025, TRP 1005 transmits beamformed broadcast signals using 8 transmission beams, the same 8 transmission beams used in third time 1020. Any of the previously described techniques for transmitting beamformed broadcast signals, such as using TX diversity, different subbands, or a combination of different subbands and TX diversity, etc., may be used.

Through the use of 2 subbands, the number of sequences required is reduced from 16 down to 8 in order to ensure that the UE is able to identify the beam identifiers of the transmission beams. Furthermore, the number of time intervals for transmitting the beamformed synchronization signals can be reduced from 4 down to 2.

According to an example embodiment, beamformed synchronization signals are simultaneously transmitted on a plurality of spatially separated transmission beams, with unique angular spacing between neighboring active transmission beams. The transmission beams transmitted together have the same identifier. The transmission beams are rotated in time with each rotation having a different identifier. The unique angular spacing between active transmission beams eliminates ambiguity. Communications systems that use wider beams and/or communications systems that operate in an environment when there are higher incidents of multiple reflections are good candidates for this example embodiment.

According to an example embodiment, the beamformed synchronization signals are simultaneously transmitted on a set of spatially separated transmission beams, where all of the transmission beams have the same beam identity. The transmission beams in the set of spatially separated transmission beams are referred to as active beams. TX diversity may be used. The angular spacing between the active beams is different in the angular coverage area. The angular coverage area may be a sector (such as 120 degrees) or 360 degrees. The active beams rotate with time, and in each rotation the active beams have a different beam identifier. The angular spacings between the active beams are maintained between rotations, and are used to help eliminate ambiguity.

Figure 11:
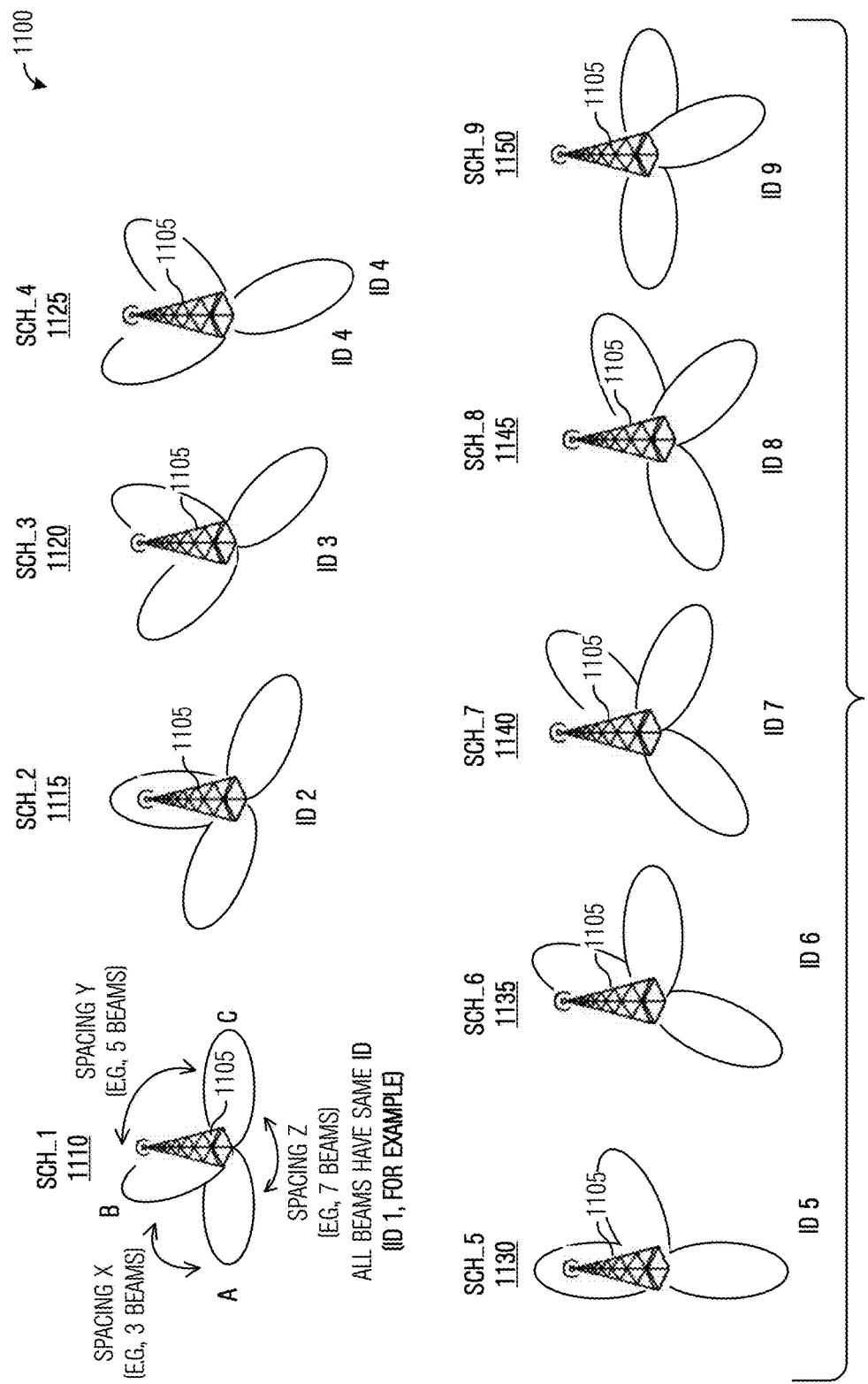
FIG. 11 illustrates an example sequence of beamformed synchronization signals transmitted by a TRP, where the active beams are spatially separated and have the same beam identity according to example embodiments described herein.

FIG. 11 illustrates an example sequence of beamformed synchronization signals transmitted by a TRP 1105, where the active beams are spatially separated and have the same beam identity. As shown in FIG. 11, a total of 9 rotations of the active beams is needed to provide full coverage, compared to 16 rotations if a single transmission beam was rotated. In a first time, TRP 1105 transmits the active beams as configured by first synchronization signals configuration (SCH_1) 1110. First synchronization signals configuration 1110 includes 3 transmission beams (labeled beams A, B, and C). As shown in FIG. 11, the spatial separation between beams A and B is X (e.g., 3 beams), the spatial spacing between beams B and C is Y (e.g., 5 beams), and the spatial separation between beams C and A is Z (e.g., 7 beams). In a second time, TRP 1105 transmits the active beams as configured by second synchronization signals configuration (SCH_2) 1115. Second synchronization signals configuration 1115 is a rotation of first synchronization signals configuration 1110 by an angular amount, e.g., a beam width. In a third time, TRP 1105 transmits the active beams as configured by third synchronization signals configuration (SCH_3) 1120. In a fourth time, TRP 1105 transmits the active beams as configured by fourth synchronization signals configuration (SCH_4) 1125. In a fifth time, TRP 1105 transmits the active beams as configured by fifth synchronization signals configuration (SCH_5) 1130. In a sixth time, TRP 1105 transmits the active beams as configured by sixth synchronization signals configuration (SCH_6) 1135. In a seventh time, TRP 1105 transmits the active beams as configured by seventh synchronization signals configuration (SCH_7) 1140. In an eighth time, TRP 1105 transmits the active beams as configured by eighth synchronization signals configuration (SCH_8) 1145. In a ninth time, TRP 1105 transmits the active beams as configured by ninth synchronization signals configuration (SCH_9) 1150.

Figure 12:
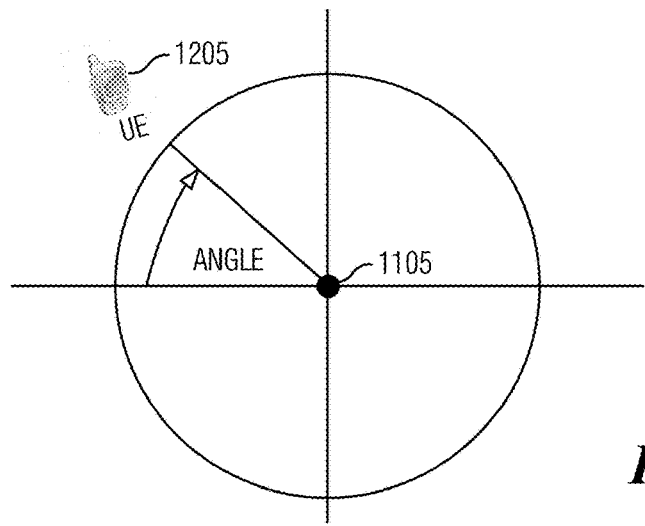
FIG. 12 illustrates angular relationship between TRP and UE according to example embodiments described herein.

It is noted that the active beams, the synchronization signal configurations, and the rotations illustrated in FIG. 11 are examples provided for discussion and are not intended to limit the scope or the spirit of the example embodiments. Alternate configurations of active beams, synchronization signal configurations, and rotations are possible as long as the total angular space (360 degrees in this example) is swept and that angular locations that are beamformed at the same time (i.e., transmission beams A, B, and C) have a unique spatial separation and transmit the same beam identifiers (beam identifying sequences, for example) to eliminate ambiguity. Each rotation of the beams in the time sequence transmits a different beam identifiers. Table 2 displays a set of beam identifiers that are detectable by UEs that are located in the coverage area of TRP 1105. The UE location in degrees is the angle relative to TRP, as shown in FIG. 12, which illustrates the relative angle between UE 1205 and TRP 1105. It is noted that at each position in the coverage area of TRP 1105, a UE detects a unique set of beam identities. Therefore, the UE is able to determine an orientation with respect to TRP 1105 and a beam index.

TABLE 2

Beam identifiers that are detectable by UEs that are located in the coverage area of a TRP.

| UE Location (degrees) | Beam Identifier |
|---|---|
| 0 | ID 1 + ID 9 |
| 22.5 | ID 2 |
| 45 | ID 3 |
| 67.5 | ID 4 |
| 90 | ID 2 + ID 5 |
| 112.5 | ID 3 + ID 6 |
| 135 | ID 4 + ID 7 |
| 157.5 | ID 5 + ID 8 |
| 180 | ID 1 + ID 6 + ID 9 |
| 202.5 | ID 2 + ID 7 |
| 225 | ID 3 + ID 8 |

TABLE 2-continued

Beam identifiers that are detectable by UEs that are located in the coverage area of a TRP.

| UE Location (degrees) | Beam Identifier |
|---|---|
| 247.5 | ID 4 + ID 9 |
| 270 | ID 5 |
| 292.5 | ID 6 |
| 315 | ID 7 |
| 337.5 | ID 8 |

Figure 13:
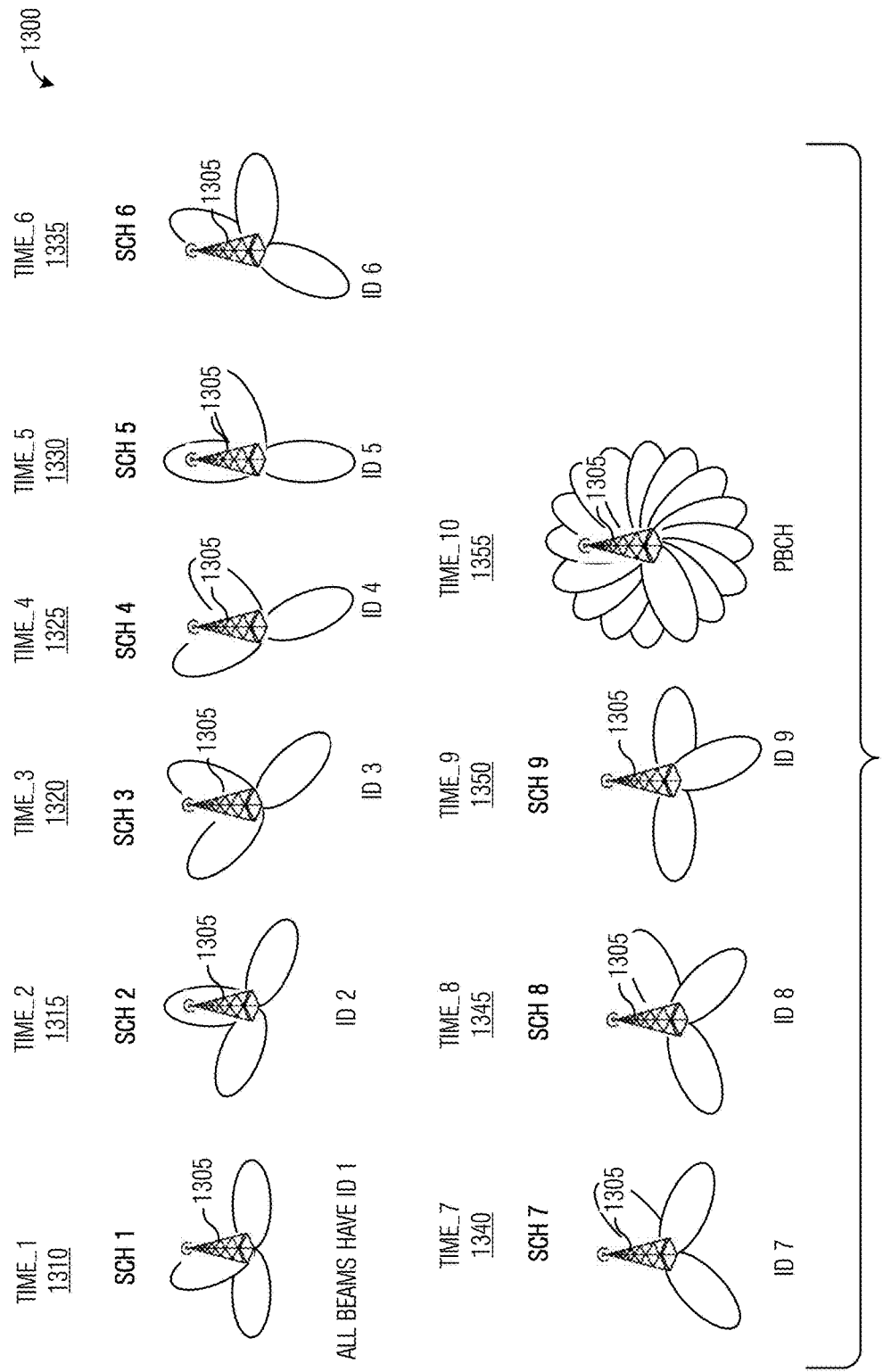
FIG. 13 illustrates a fourth example sequence of beamformed transmissions made by a TRP according to example embodiments described herein.

FIG. 13 illustrates a fourth example sequence of beamformed transmissions made by a TRP 1305. TRP 1305 is transmitting beamformed signals using a set of spatially separated transmission beams (i.e., active beams) with rotations applied at different time intervals. All active beams have the same beam identity in a single time interval. At a first time (time_1) 1310, TRP 1305 transmits beamformed synchronization signals using 3 active beams with beam identity 1. At a second time (time_2) 1315, TRP 1305 transmits beamformed synchronization signals using 3 active beams with beam identity 2. At a third time (time_3) 1320, TRP 1305 transmits beamformed synchronization signals using 3 active beams with beam identity 3. At a fourth time (time_4) 1325, TRP 1305 transmits beamformed synchronization signals using 3 active beams with beam identity 4. At a fifth time (time_5) 1330, TRP 1305 transmits beamformed synchronization signals using 3 active beams with beam identity 5. At a sixth time (time_6) 1335, TRP 1305 transmits beamformed synchronization signals using 3 active beams with beam identity 6. At a seventh time (time_7) 1340, TRP 1305 transmits beamformed synchronization signals using 3 active beams with beam identity 7. At an eighth time (time_8) 1345, TRP 1305 transmits beamformed synchronization signals using 3 active beams with beam identity 8. At a ninth time (time_9) 1350, TRP 1305 transmits beamformed synchronization signals using 3 active beams with beam identity 9. At a tenth time (time_10) 1355, TRP 1305 transmits beamformed broadcast signals using all available transmission beams. Any of the previously described techniques for transmitting beamformed broadcast signals, such as using TX diversity, different subbands, or a combination of different subbands and TX diversity, etc., may be used. If a TRP is not capable of simultaneously transmitting the beamformed broadcast signals on all transmission beams, the beamformed broadcast signals may be transmitted in different subsets of all transmission beams in different subframes.

When a UE detects a beamformed synchronization signal (and synchronizes its receiver), the UE will know the timing offset to receive and demodulate the beamformed broadcast signals because the frame structure is fixed. Due to the nature of this example embodiment, all time instances of the beamformed synchronization signals (e.g., subframes) will be received before the UE can unambiguously determine which beam direction from the TRP is the best direction. Once the UE has detected at least one beam identity with the correct timing, the UE may need to continue detecting to the subsequent sets of beamformed synchronization signals in order to fully establish the correct beam from the TRP.

According to an example embodiment, the beamformed synchronization signals are transmitted in multiple subbands with the same transmission beam directions to support frequency diversity or with different transmission beam directions to reduce overhead in the time dimension. As discussed previously, when the different beamformed synchronization signals are transmitted in different subbands with different transmission beam directions, different beam identifiers are used.

Figure 14:
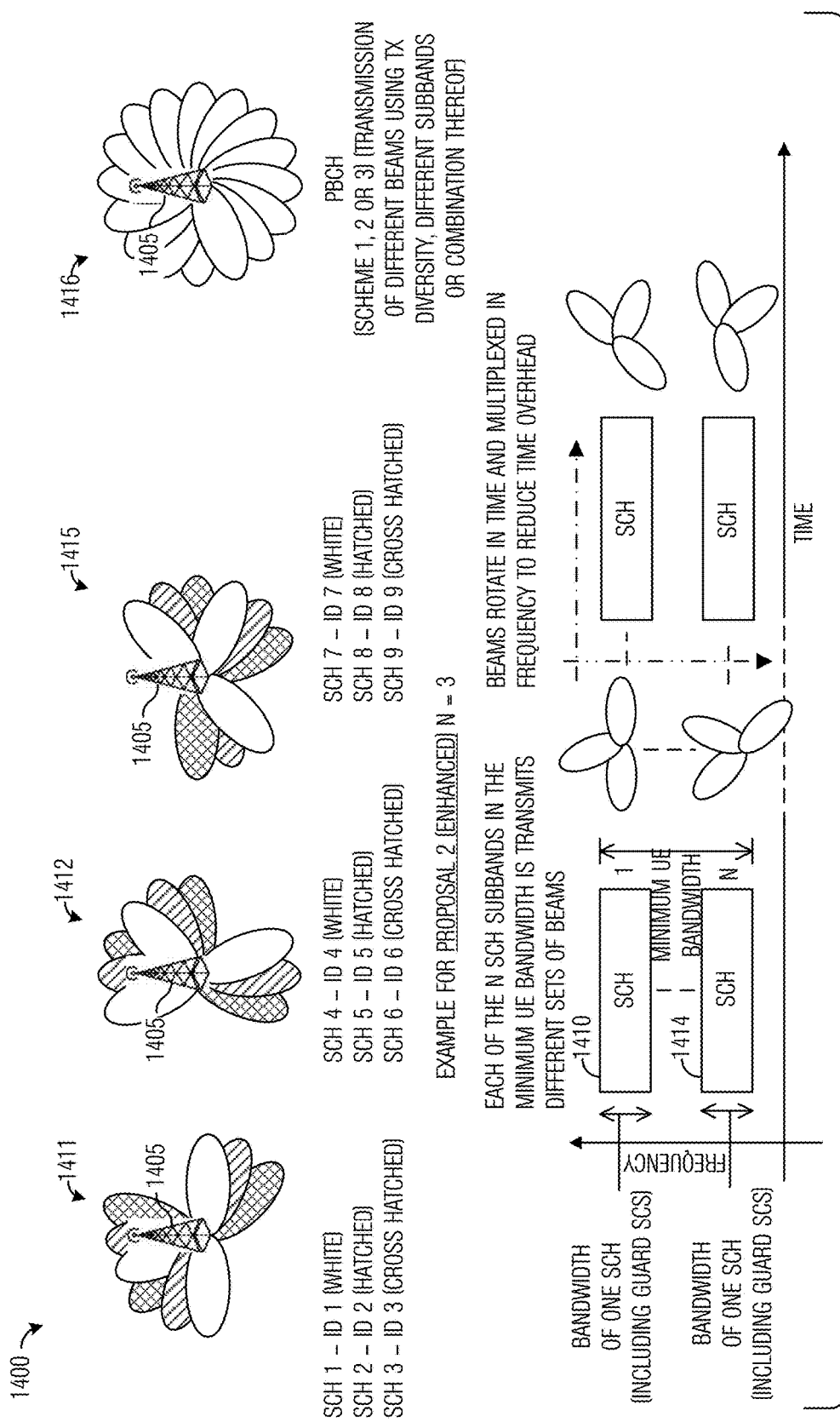
FIG. 14 illustrates a fifth example sequence of beamformed transmissions made by a TRP according to example embodiments described herein.

FIG. 14 illustrates a fifth example sequence of beamformed transmissions made by a TRP 1405. TRP 1405 is transmitting beamformed signals using a set of spatially separated transmission beams (i.e., active beams) in different frequency subbands with rotations applied at different times with the number of subbands equal to 3. All active beams within a single frequency subband in a single time have the same beam identity, but the beam identities change in different time intervals, even for the same active beams within the single frequency subband. In a first subband 1410 and at a first time, TRP 1405 transmits beamformed synchronization signals using active beams with beam identifier 1 (shown as white beams in combined first transmissions 1411), at the same time and in a second subband TRP 1405 transmits beamformed synchronization signals using the active beams using a first rotation with beam identifier 2 (shown as hatched beams in combined first transmissions 1411), and at a third subband TRP 1405 transmits beamformed synchronization signals using active beams after a second rotation with beam identifier 3 (shown as cross hatched beams in combined first transmissions 1411). In a second time and in a the first subband, TRP 1405 transmits beamformed synchronization signals using active beams with beam identifier 4 (shown as white beams in combined second transmissions 1412), and at the same time TRP 1405 transmits beamformed synchronization signals using the active beams after the first rotation with beam identifier 5 (shown as hatched beams in combined second transmissions 1412), and at the same time TRP 1405 transmits beamformed synchronization signals using active beams using a further rotation with beam identifier 6 (shown as cross hatched beams in combined second transmissions 1412).

In a third time 1415 and in a first sub-band, TRP 1405 transmits beamformed synchronization signals using active beams with beam identifier 7 (shown as white beams in combined third transmissions 1415), at the same time TRP 1405 transmits beamformed synchronization signals using the active beams rotated and with beam identifier 8 (shown as hatched beams in combined third subband transmissions 1415), and at the same time TRP 1405 transmits beamformed synchronization signals using active beams rotated with beam identifier 9 (shown as cross hatched beams in combined third transmissions 1415). At a fourth time, TRP 1405 transmits beamformed broadcast signals as shown in combined transmissions 1416. Any of the previously described techniques for transmitting beamformed broadcast signals, such as using TX diversity, different subbands, or a combination of different subbands and TX diversity, etc., may be used.

In order for a UE to demodulate system information from beamformed broadcast signals, the UE needs to be time (on a frame and subframe basis) and frequency synchronized with the TRP. As discussed previously, if the UE is able to determine the TRP beam index, the UE will also know the time offset between the received beamformed synchronization signal and the beamformed broadcast signals. Other benefits may be involved with the obtaining of the TRP beam index, as described below.

Figure 15:
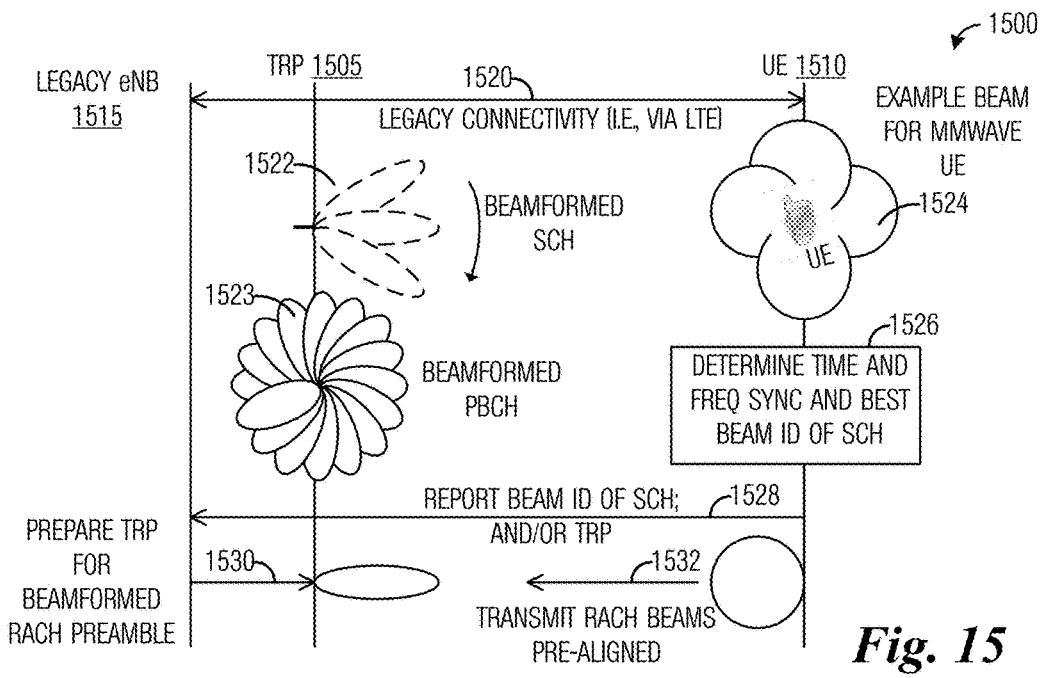
FIG. 15 illustrates a diagram of messages exchanged and processing performed by devices participating in synchronization according to example embodiments described herein.

If the UE is able to determine good candidate beam directions from the TRP during the synchronization stage and feedback the information to the TRP (using dual connectivity with a legacy carrier, such as 3GPP LTE, or otherwise), subsequent processing or messaging to establish uplink synchronization (i.e., when beamforming a RACH signal) or the assignment of UE specific beamformed reference signals can be reduced. FIG. 15 illustrates a diagram 1500 of messages exchanged and processing performed by devices participating in synchronization. Devices participating in synchronization include a TRP 1505, a UE 1510, and a legacy eNB 1515. A legacy connection 1520 exists between UE 1510 and legacy eNB 1515. TRP 1505 transmits beamformed synchronization signals and beamformed broadcast signals (events 1522 and 1523), and UE 1510 receives the beamformed synchronization signals (event 1524) and determines time and frequency synchronization, as well as best beam identity (block 1526). UE 1510 provides feedback of the best beam identity, as well as optionally identifier of TRP 1505 to legacy eNB 1515 (event 1528). Legacy eNB 1515 prepares TRP 1505 for beamformed RACH (event 1530), by providing the information received from UE 1510, for example. UE 1510 transmits a beamformed RACH that is already pre-aligned to TRP 1505 (event 1532).

Furthermore, identifying and providing feedback about beam identities of neighboring TRPs (derived from the beamformed synchronization identifiers of the neighboring TRPs) to the current TRP (or presently connected TRP) can also accelerate neighbor cell reporting compared to simply providing feedback about the beam-formed CSI-RS of the neighboring TRPs. This acceleration compared to using beam-formed CSI-RS is due to the fact, that beamformed CSI-RS indices of neighboring cells can only be obtained once the CSI-RS configuration of the neighboring TRPs is known by the UE (by demodulating the beamformed broadcast signals or otherwise, for example) before the beamformed CSI-RS can be demodulated. In co-assigned patent application entitled "Beam Detection, Beam Tracking and Random Access in MM-Wave Small Cells in Heterogeneous Network," application Ser. No. 14/791,112, filed Jul. 2, 2015, which is hereby incorporated herein by reference, techniques for feeding back beam index information from beamformed CSI-RS (after synchronizing and demodulating the beamformed broadcast signals) using dual connectivity to reduce processing are provided. In co-assigned patent application entitled "System and Method for Initial Attachment in a Communications System Utilizing Beam-Formed Signals," application Ser. No. 15/133,285, filed Apr. 20, 2016, which is hereby incorporated by reference, techniques for utilizing the boundary between different synchronization signals transmitted on wide beams to determine the timing of RACH transmissions are provided.

Depending upon the system used, different sets of sequences may be used to identify each of the beamformed synchronization signals. As an example, if the communications system is using single carrier modulation with frequency domain equalization (SC/FDE), Golay codes may be chosen, while if the communications system is using orthogonal frequency division multiplexing (OFDM), Zad-off-Chu (ZC) sequences may be chosen. Golay codes and ZC sequences are intended to be examples.

Figure 16:
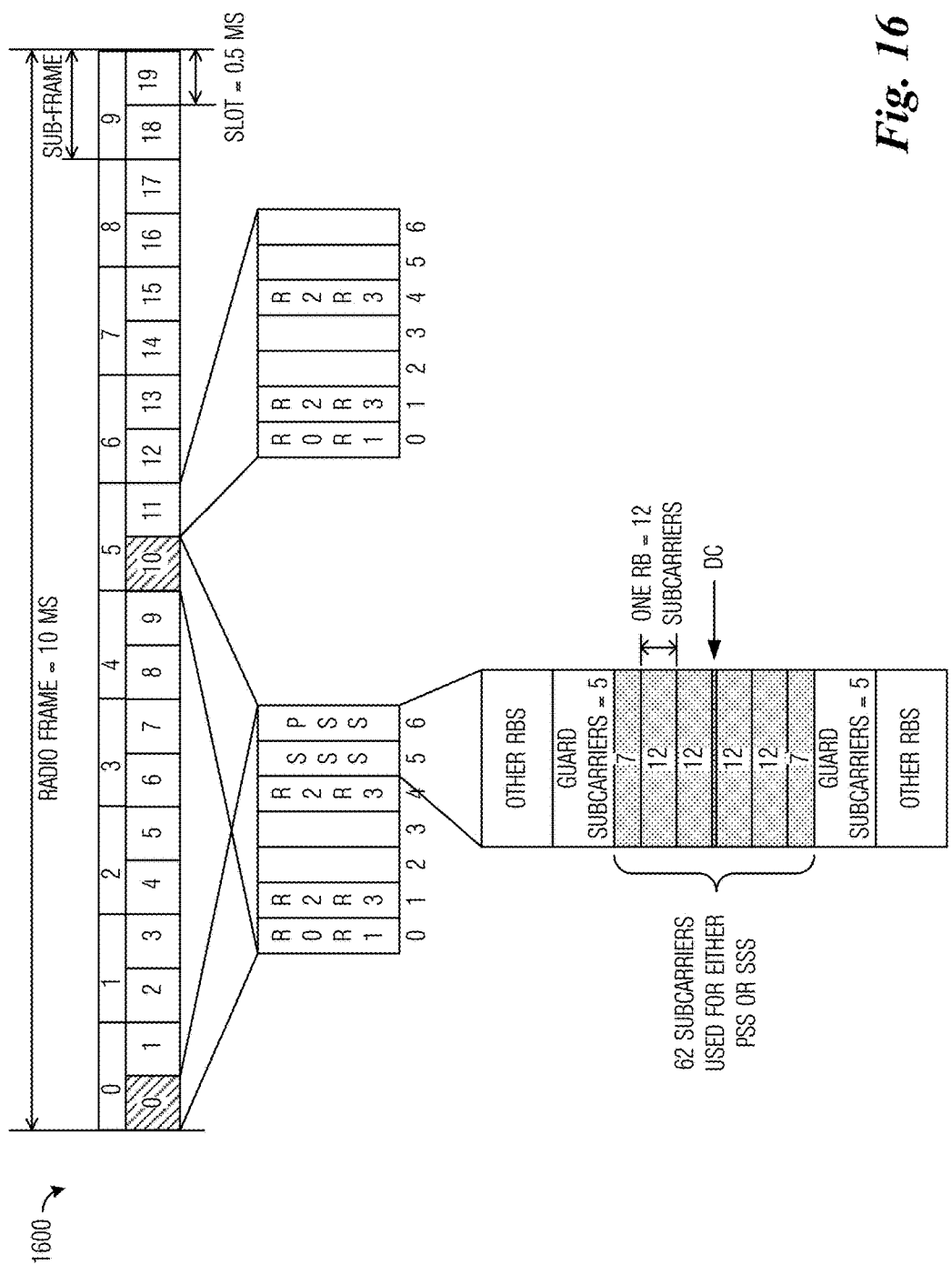
FIG. 16 illustrate a diagram of PSS and SSS in current generation 3GPP LTE communications systems according to example embodiments described herein.

FIG. 16 illustrate a diagram 1600 of PSS and SSS in current generation 3GPP LTE communications systems. As shown in FIG. 1600, the same PSS is sent twice in every frame (every 10 slots) and indicates the physical (PHY) layer identity $N_{ID}^{(2)}(0,1,2)$ based on the root of the ZC sequence root. The SSS sequence is an interleaved combination of two length-31 sequences and is scrambled by a sequence derived from the PSS (the combination changes between slot 0 and slot 10. The SSS sequence indicates the PHY layer cell identifier $N_{ID}^{(1)}$, where cell identifier=$N_{ID}^{cell}$=3 $N_{ID}^{(1)}$+$N_{ID}^{(2)}$.

Due to the current arrangement of the PSS/SSS in 3GPP LTE, the UE can obtain frame and slot timing, as well as obtain the cell identifier from the synchronization phase. The total required overhead is 6 RBs in 4 slots of each frame (each frame has 120 slots). The exact overhead depends upon the system bandwidth use, but may be as high as 3.33% when the system bandwidth is only 6 RBs.

In communications systems that use beamformed synchronization signals, such as those communications systems discussed herein, 2 sets of items may be obtained:

a) Beam identifier (spatial synchronization), frequency and time (frame and slot) synchronization; or b) Cell identifier, beam identifier (spatial synchronization), frequency and time (frame and slot) synchronization. It is clear that (b) would require a higher overhead compared to (a). Generic solutions for both (a) and (b) using the techniques described herein are provided.

Figure 17:
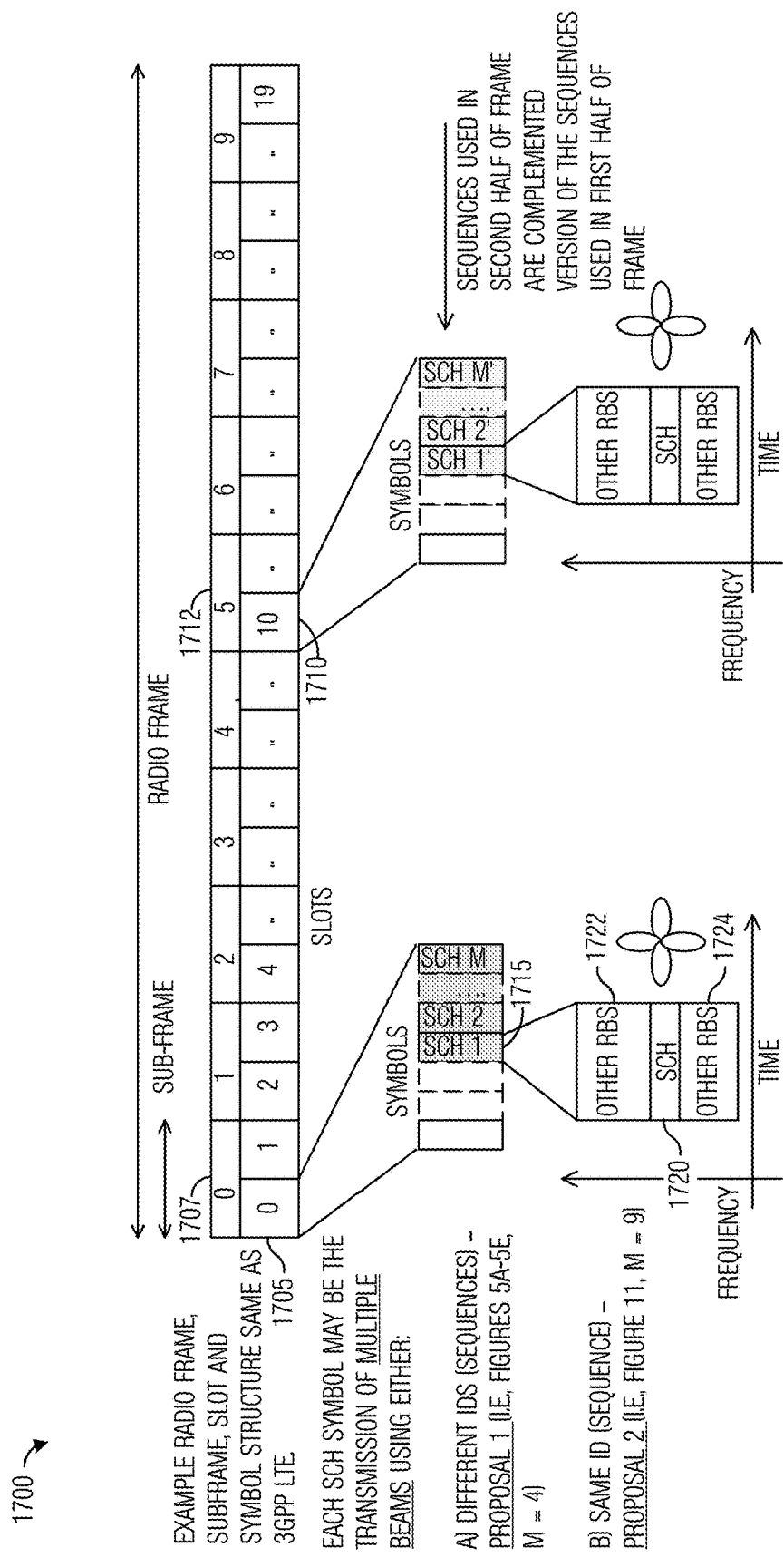
FIG. 17 illustrates a first example beamformed synchronization signal payload and frame structure for spatial, frequency and time synchronization according to example embodiments described herein.

FIG. 17 illustrates a first example beamformed synchronization signal payload and frame structure 1700 for spatial, frequency and time synchronization. Beamformed synchronization signal frame structure 1700 includes 10 subframes with 2 slots each subframe, including slot 0 1705 of subframe 0 1707 and slot 10 1710 of subframe 5 1712. Slot 0 1705, as well as slot 10 1710, comprises a plurality of symbols, some of which are used to convey the beamformed synchronization signals. As an example, symbol 1715 of slot 0 1705 includes RBs, such as RBs 1720, dedicated for transmitting the beamformed synchronization signals, as well as other RBs, such as RBs 1722 and 1724, which are used by other signals.

According to an embodiment, the sequences used in the second half of a frame structure, such as frame structure 1700, are complementary versions of the sequences used in the first half of frame structure, so the different pails of the frame can be identified and the subframe and frame timing can be established. In such a situation, each beamformed synchronization signal symbol is transmitted twice in each frame. Search complexity may be simplified and frame and slot timing is enabled. As used herein, complementary sequences may include cyclically shifted sequences, conjugated sequences, sequences with different roots, phase shifts and so on.

Figure 18:
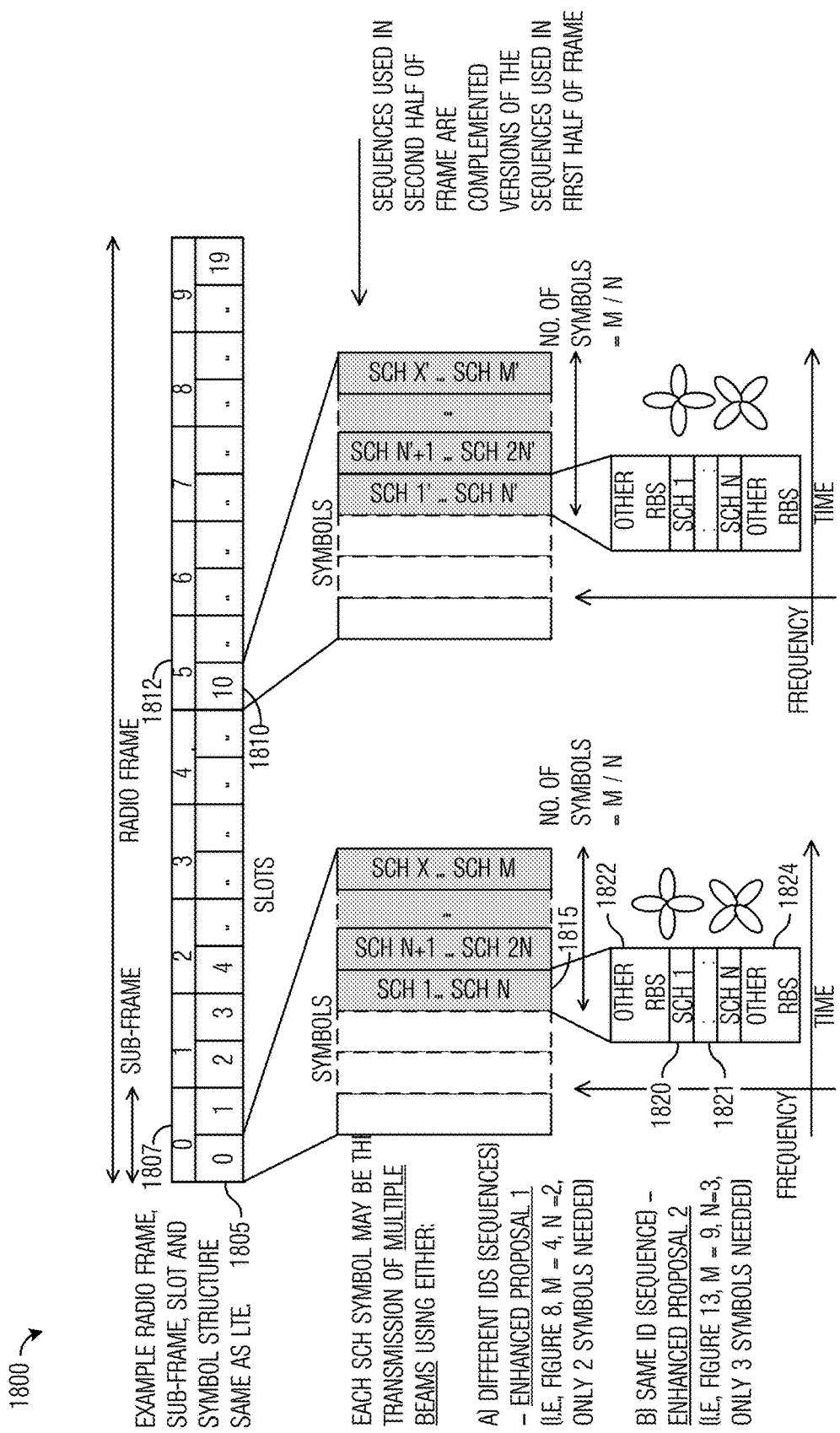
FIG. 18 illustrates a second example beamformed synchronization signal payload and frame structure for spatial, frequency and time synchronization according to example embodiments described herein.

FIG. 18 illustrates a second example beamformed synchronization signal payload and frame structure 1800 for spatial, frequency and time synchronization. Beamformed synchronization signal frame structure 1800 includes 10 subframes with 2 slots in each subframe, including slot 0 1805 of subframe 0 1807 and slot 10 1810 of subframe 5 1812. Slot 0 1805, as well as slot 10 1810, comprises a plurality of symbols, some of which are used to convey the beamformed synchronization signals. As an example, symbol 1815 of slot 0 1805 includes RBs, such as RBs 1820 and 1821, dedicated for transmitting different rotations of the beamformed synchronization signals, as well as other RBs, such as RBs 1822 and 1824, dedicated for other uses. As an example, RBs 1820 is used to transmit a first rotation of the beamformed synchronization signals and RBs 1821 is used to transmit a second rotation of the beamformed synchronization signals.

According to an embodiment, the sequences used in the second half of a frame structure, such as frame structure 1800, are complementary versions of the sequences used in the first half of frame structure so the different parts of the frame can be identified and the subframe and frame timing can be established. The number of beamformed synchronization signal symbols may be reduced by a factor of M/N as shown in FIG. 18, where M is the normal number of rotations needed and N is the number of frequency sub-bands.

Figure 19A:
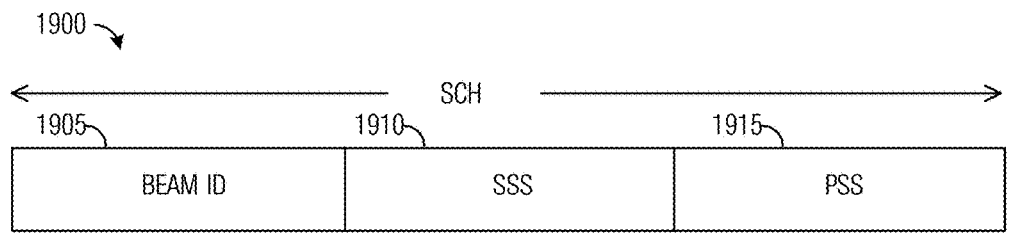
FIG. 19A illustrates a first example beamformed synchronization signal format according to example embodiments described herein.

In order for a UE to determine the cell identifier or some kind of identifier of the TRP, additional information is needed. According to an example embodiment, each active beam transmitting a beamformed synchronization signal includes a beam identifier, a SSS, and a PSS. FIG. 19A illustrates a first example beamformed synchronization signal format 1900. Beamformed synchronization signal format 1900 includes a beam identifier field 1905, a SSS field 1910, and a PSS field 1915. Beam identifier field 1905 includes a sequence that is related to the beam identifier associated with the active beam. SSS field 1910 includes a sequence that is related to the SSS, such as a scrambling code. The sequence is mapped to $N_{ID}^{(1)}$ and the sequence used in slot 0 is different from the sequence used in slot 10. PSS field 1915 includes a sequence that is the same for all active beams from a single TRP. The sequence is mapped to PHY layer identity $N_{ID}^{(2)}$.

Figure 19B:
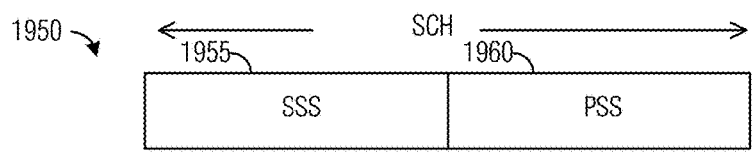
FIG. 19B illustrates a second example beamformed synchronization signal format according to example embodiments described herein.

According to an example embodiment, each active beam transmitting a beamformed synchronization signal includes a beam identifier and a SSS combined into one sequence, and a PSS. FIG. 19B illustrates a second example beamformed synchronization signal format 1950. Beamformed synchronization signal format 1950 includes a SSS field 1955 and a PSS field 1960. SSS field 1955 includes a sequence to the SSS, such as a scrambling code. The sequence is mapped to $N_{ID}^{(1)}$ and the sequence used in slot 0 is different from the sequence used in slot 10. The sequence is also mapped to the beam identifier, such as a phase shift, a cyclic shift, a code group mapping, and so on. PSS field 1960 includes a sequence that is the same for all active beams from a single TRP. The sequence is mapped to PHY layer identity $N_{ID}^{(2)}$. Because the example embodiments discussed herein reduce time overhead, both schemes in FIG. 19A or 19B can be accommodated. If the techniques illustrated in FIG. 8 are implemented (labeled as enhanced proposal 1 in FIG. 18), the implementation of FIG. 19B would incur an overhead of 4 symbols in slots 0 and 10 of a frame when the number of sub-bands is fixed to 2 (N=2), four beam are transmitted at the same time and a total 16 beam directions are required. Other variations are possible.

In order for a UE to detect beamformed synchronization signals, the UE will generally listen on all available receiver chains and will have a bank of parallel correlators matched to known sequences. In a situation when the UE uses beamforming, e.g., with 90 degree half power bandwidth (HPBW) beams, the different receiver chains may listen to different beam directions simultaneously. If the UE has 4 receive chains, the UE would be able to listen in all directions (360 degrees) simultaneously. The number of available receiver chains at the UE may be lower if the UE is monitoring neighboring TRPs at the same time as it is receiving from the connected TRP.

In order to enable the reception of interference free beamformed synchronization signals for cell edge users, the beamformed synchronization signals may be coordinated in time, frequency, and angular space, so that cell edge users only receive one beamformed synchronization signal at a given frequency-time resource. Techniques for coordinating devices in the time, frequency, and angular space are discussed in co-assigned patent application entitled "System and Method for beam-formed reference and control signals," U.S. application Ser. No. 14/815,571, filed Jul. 31, 2015, which is hereby incorporated herein by reference. In a situation when the UE is using beamforming, it may only be required for the TRPs to be coordinated when the TRPs are part of an ultra-dense network (UDN) or when each user's beam can receive signals from different TRP simultaneously.

Figure 20A:
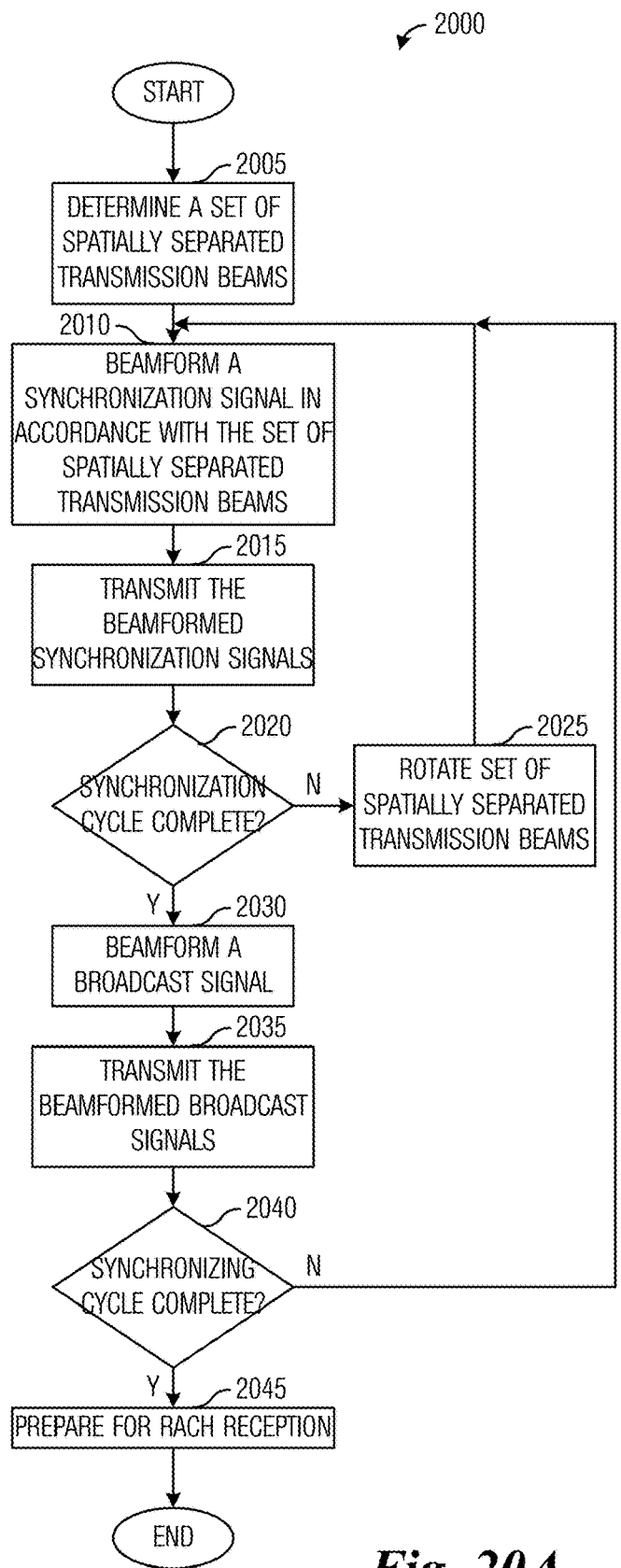
FIG. 20A illustrates a flow diagram of first example operations occurring in a TRP transmitting beamformed control signals according to example embodiments described herein.

FIG. 20A illustrates a flow diagram of first example operations 2000 occurring in a TRP transmitting beamformed control signals. Operations 2000 may be indicative of operations occurring in a TRP of a communications system as the TRP transmits beamformed control signals, including synchronization signals and broadcast signals.

Operations 2000 begin with the TRP determining a set of spatially separated transmission beams (block 2005). The set of spatially separated transmission beams may be specified by a technical standard or an operator of the communications system. In such a situation, the set of spatially separated transmission beams may be stored in memory of the TRP. Alternatively, the TRP may retrieve the set of spatially separated transmission beams from a server (local or remote) or from some other device in the communications system The set of spatially separated transmission beams may be coordinated with sets of spatially separated transmission beams of neighboring TRPs. Alternatively, the TRP may select the set of spatially separated transmission beams. The selection of the set of spatially separated transmission beams may be made in accordance with factors such as a number of available transmission beams, a number of available frequency subbands, beamforming capabilities of the TRP, receive capabilities of the UEs, mobility of the UEs, tolerable communications overhead, tolerable synchronization latency, and so on.

The TRP beamforms a synchronization signal in accordance with the set of spatially separated transmission beams (block 2010). If multiple subbands are used, the TRP may beamform the synchronization signal in accordance with the set of spatially separated transmission beams for each of the subbands. The TRP transmits the beamformed synchronization signals (block 2015). The transmission of the beamformed synchronization signals may occur in a single band or in multiple subbands, depending on the configuration of the communications system. The TRP performs a check to determine if a synchronization cycle is complete (block 2020). As an example, the synchronization cycle is complete if the TRP has transmitted beamformed synchronization signals on all available transmission beams. Alternatively, the synchronization cycle may be shorter than what is needed to allow the TRP to transmit beamformed synchronization signals on all available transmission beams. An example of such synchronization cycles are shown in FIGS. 6A-6F, where a full synchronization cycle would comprise 4 rotations of the set of spatially separated transmission beams but the synchronization cycle is partitioned into two separate synchronization cycles of 2 rotations of the set of spatially separated transmission beams each. If the synchronization cycle is not complete, the TRP rotates the set of spatially separated transmission beams (block 2025). The rotation of the set of spatially separated transmission beams is specified during the determining of the set of spatially separated transmission beams and ensures that the TRP transmits the beamformed synchronization signals on all available transmission beams by the time the synchronization cycle (or synchronization cycles in the situation where the synchronization cycle is shorter than what is needed to allow the TRP to transmit beamformed synchronization signals on all available transmission beams) is complete. The TRP returns to block 2010 to beamform the synchronization signal in accordance with the rotated set of spatially separated transmission beams.

If the synchronization cycle is complete, the TRP beamforms a broadcast signal (block 2030) and transmits the beamformed broadcast signals (block 2035). Any of the previously described techniques for transmitting beamformed broadcast signals, such as using TX diversity, different subbands, or a combination of different subbands and TX diversity, etc., may be used. If the synchronization cycle was partitioned into multiple synchronization cycles, the TRP returns to block 2010 to start another synchronization cycle. The TRP performs a check to determine if the synchronizing cycle is complete (block 2040). If the synchronizing cycle is not complete, the TRP changes the set of spatially separated transmission beams (which may be as simple as applying a rotation to the set of spatially separated transmission beams) and returns to block 2010 to continue transmission of beamformed synchronization signals. For discussion purposes, consider the synchronization cycles as shown in FIGS. 6A-6F; In such a situation, a first synchronization cycle comprises transmissions on 2 rotations of the set of spatially separated transmission beams as shown in FIGS. 6A and 6B and a second synchronization cycle comprises transmissions on 2 rotations of the set of spatially separated transmission beams as shown in FIGS. 6D and 6E, while the synchronizing cycle comprises the transmissions as shown in FIGS. 6A-6F. Once the synchronizing cycle is complete, the TRP may prepare for RACH reception from a UE (block 2040).

Figure 20B:
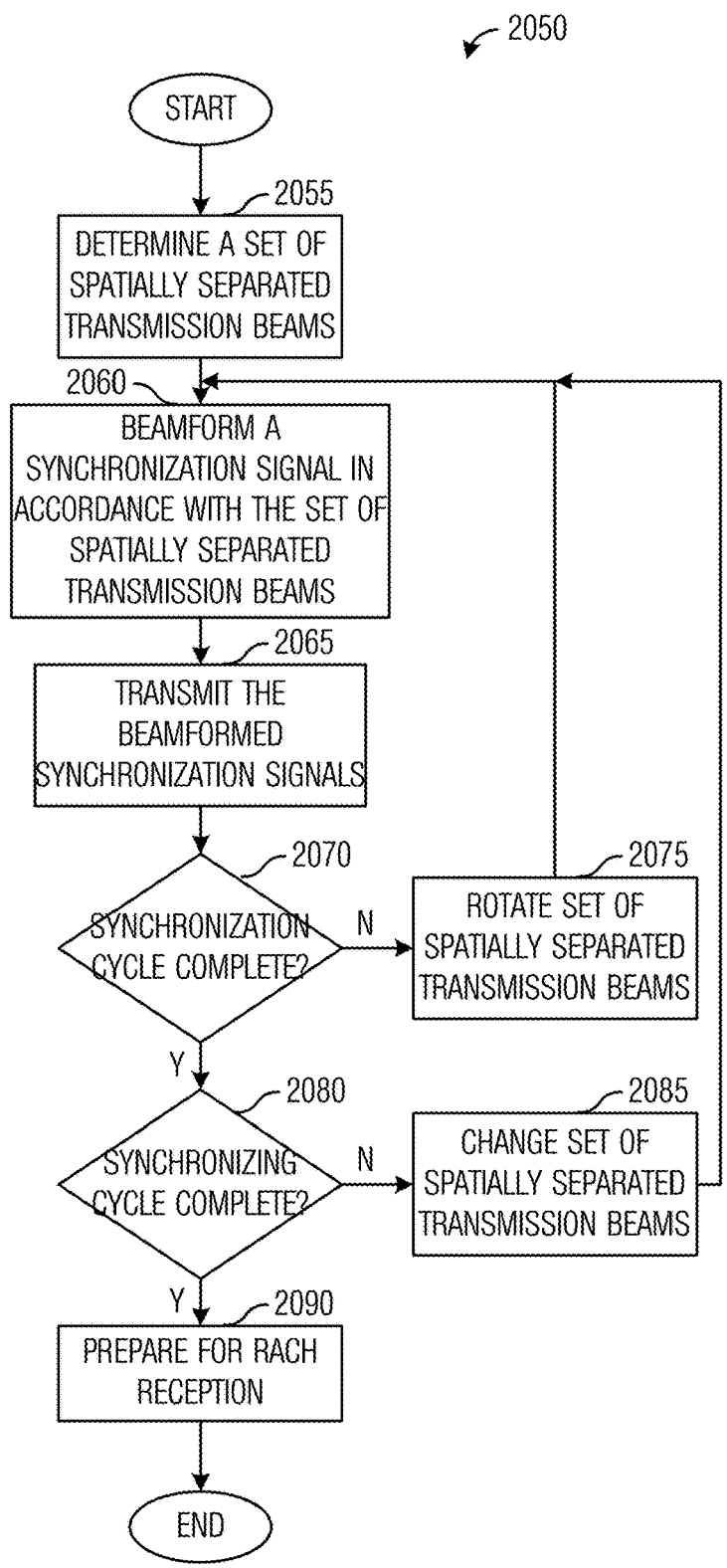
FIG. 20B illustrates a flow diagram of second example operations occurring in a TRP transmitting beamformed control signals according to example embodiments described herein.

FIG. 20B illustrates a flow diagram of second example operations 2050 occurring in a TRP transmitting beamformed signals. Operations 2050 may be indicative of operations occurring in a TRP of a communications system as the TRP transmits beamformed signals, including synchronization signals. It is noted that operations 2050 may be applicable in situations where an entity other than the TRP transmits broadcast signals, such as in a heterogeneous deployment or a dual connectivity deployment, transmits broadcast signals and the TRP transmits beamformed signals (including synchronization signals).

Operations 2050 begin with the TRP determining a set of spatially separated transmission beams (block 2055). The set of spatially separated transmission beams may be specified by a technical standard or an operator of the communications system. In such a situation, the set of spatially separated transmission beams may be stored in memory of the TRP. Alternatively, the TRP may retrieve the set of spatially separated transmission beams from a server (local or remote) or from some other device in the communications system The set of spatially separated transmission beams may be coordinated with sets of spatially separated transmission beams of neighboring TRPs. Alternatively, the TRP may select the set of spatially separated transmission beams. The selection of the set of spatially separated transmission beams may be made in accordance with factors such as a number of available transmission beams, a number of available frequency subbands, beamforming capabilities of the TRP, receive capabilities of the UEs, mobility of the UEs, tolerable communications overhead, tolerable synchronization latency, and so on.

The TRP beamforms a synchronization signal in accordance with the set of spatially separated transmission beams (block 2060). If multiple subbands are used, the TRP may beamform the synchronization signal in accordance with the set of spatially separated transmission beams for each of the subbands. The TRP transmits the beamformed synchronization signals (block 2065). The transmission of the beamformed synchronization signals may occur in a single band or in multiple subbands, depending on the configuration of the communications system. The TRP performs a check to determine if a synchronization cycle is complete (block 2070). As an example, the synchronization cycle is complete if the TRP has transmitted beamformed synchronization signals on all available transmission beams. Alternatively, the synchronization cycle may be less than what is needed to allow the TRP to transmit beamformed synchronization signals on all available transmission beams. An example of such synchronization cycles are shown in FIGS. 6A-6F, where a full synchronization cycle would comprise 4 rotations of the set of spatially separated transmission beams but the synchronization cycle is partitioned into two separate synchronization cycles of 2 rotations of the set of spatially separated transmission beams each. If the synchronization cycle is not complete, the TRP rotates the set of spatially separated transmission beams (block 2075). The rotation of the set of spatially separated transmission beams is specified during the determining of the set of spatially separated transmission beams and ensures that the TRP transmits the beamformed synchronization signals on all available transmission beams by the time the synchronization cycle is complete. The TRP returns to block 2060 to beamform the synchronization signal in accordance with the rotated set of spatially separated transmission beams. If the synchronization cycle is complete, the TRP performs a check to determine if the synchronizing cycle is complete (block 2080). If the synchronizing cycle is not complete, the TRP changes the set of spatially separated transmission beams (which may be as simple as applying a rotation to the set of spatially separated transmission beams) (block 2085) and returns to block 2060 to continue transmission of beamformed synchronization signals. Once the synchronizing cycle is complete, the TRP may prepare for RACH reception from a UE (block 2090).

Figure 21:
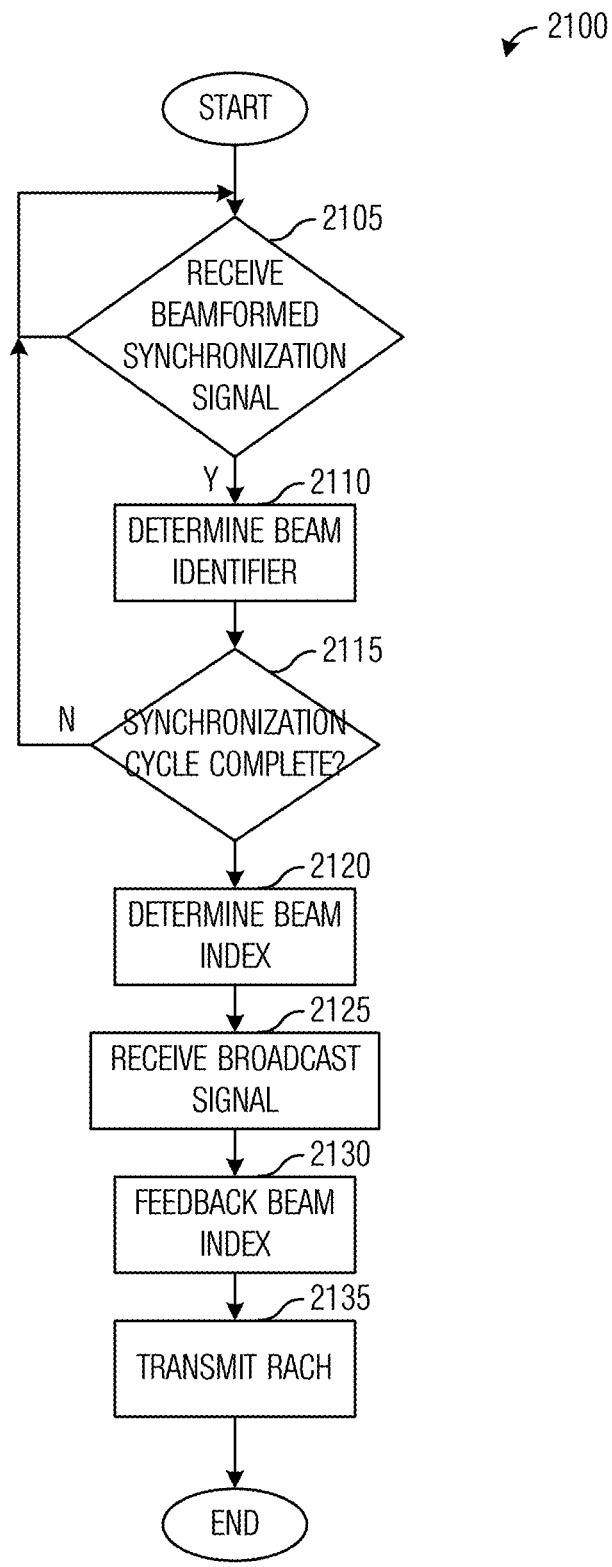
FIG. 21 illustrates a flow diagram of example operations occurring in a UE performing synchronization according to example embodiments described herein.

FIG. 21 illustrates a flow diagram of example operations 2100 occurring in a UE performing synchronization. Operations 2100 may be indicative of operations occurring in a UE of a communications system as the UE performs synchronization utilizing beamformed control signals, including synchronization signals and broadcast signals.

Operations 2100 begins with the UE performing a check to determine if a beamformed synchronization signal has been received (block 2105). If a beamformed synchronization signal has been received, the UE determines the beam identifier of the received beamformed synchronization signal (block 2110). The UE performs a check to determine if the synchronization cycle is complete (block 2115). If the synchronization cycle is not complete, the UE returns to block 2105 to potentially receive additional beamformed synchronization signals. The UE may not receive any other beamformed synchronization signals depending on the location of the UE with respect to the TRP transmitting the beamformed synchronization signals.

If the synchronization cycle is complete, the UE determines a beam index of a transmission beam oriented towards the UE (block 2120). The determination of the beam index is made using the one or more beam identities of the one or more beamformed synchronization signals received by the UE, as determined in block 2110. The UE receives a broadcast signal (block 2125). The broadcast signal may be a beamformed broadcast signal from the TRP, such as described in FIG. 20A. Alternatively, the broadcast signal may be received from a legacy eNB in a dual connectivity deployment. Although the discussion focuses on the broadcast signal being received once the synchronization cycle is complete, the broadcast signal may be received at any time, such as before the synchronization cycle, during the synchronization cycle, or after the synchronization cycle. It is noted that if the synchronization cycle is partitioned into multiple synchronization cycles, such as shown in FIGS. 6A-6F, the UE is not ensured of receiving either a beamformed synchronization signal or a beamformed broadcast signal in any given synchronization cycle. However, the UE is ensured of receiving at least one beamformed synchronization signal and one broadcast signal over the entirety of the synchronizing cycle.

The UE optionally feeds back the beam index (block 2130). In a dual connectivity deployment, the beam index may be fedback to a legacy eNB that is serving the UE. The UE performs a RACH procedure with the TRP (block 2135). The TRP can use this beam index information to prepare the TRP to receive on the correct beam for the RACH procedure. UE uses the beam index for timing information and to know when to transmit the RACH. The UE may beamform the RACH transmission in accordance with the beam index.

Figure 22:
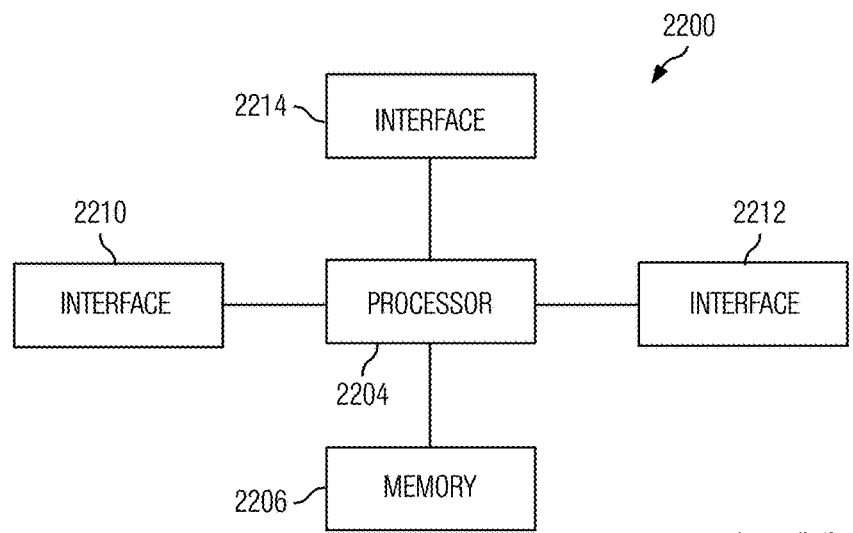
FIG. 22 illustrates a block diagram of an embodiment processing system for performing methods described herein.

FIG. 22 illustrates a block diagram of an embodiment processing system 2200 for performing methods described herein, which may be installed in a host device. As shown, the processing system 2200 includes a processor 2204, a memory 2206, and interfaces 2210-2214, which may (or may not) be arranged as shown in FIG. 22. The processor 2204 may be any component or collection of components adapted to perform computations and/or other processing related tasks, and the memory 2206 may be any component or collection of components adapted to store programming and/or instructions for execution by the processor 2204. In an embodiment, the memory 2206 includes a non-transitory computer readable medium. The interfaces 2210, 2212, 2214 may be any component or collection of components that allow the processing system 2200 to communicate with other devices/components and/or a user. For example, one or more of the interfaces 2210, 2212, 2214 may be adapted to communicate data, control, or management messages from the processor 2204 to applications installed on the host device and/or a remote device. As another example, one or more of the interfaces 2210, 2212, 2214 may be adapted to allow a user or user device (e.g., personal computer (PC), etc.) to interact/communicate with the processing system 2200. The processing system 2200 may include additional components not depicted in FIG. 22, such as long term storage (e.g., non-volatile memory, etc.).

In some embodiments, the processing system 2200 is included in a network device that is accessing, or part otherwise of, a telecommunications network. In one example, the processing system 2200 is in a network-side device in a wireless or wireline telecommunications network, such as a base station, a relay station, a scheduler, a controller, a gateway, a router, an applications server, or any other device in the telecommunications network. In other embodiments, the processing system 2200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 23:
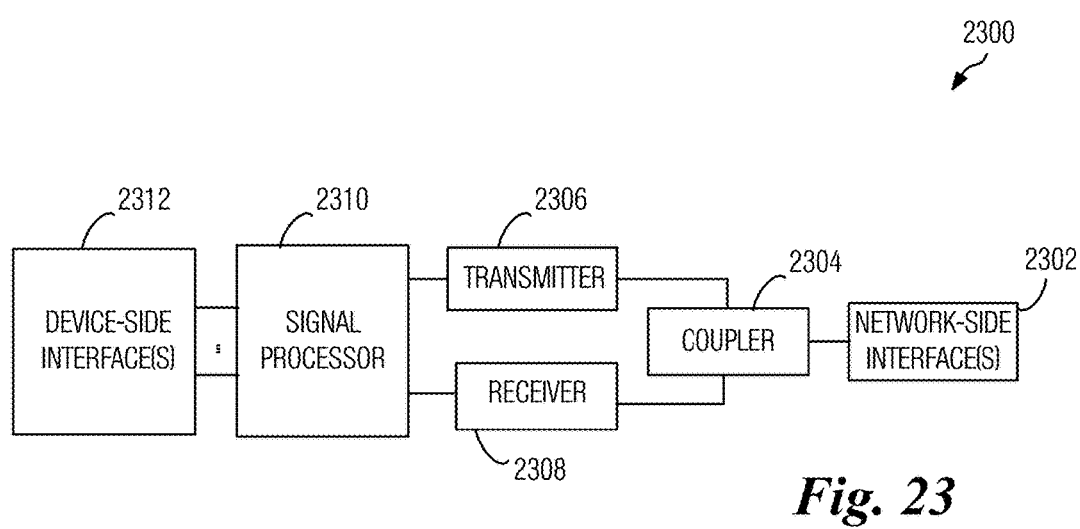
FIG. 23 illustrates a block diagram of a transceiver adapted to transmit and receive signaling over a telecommunications network according to example embodiments described herein.

In some embodiments, one or more of the interfaces 2210, 2212, 2214 connects the processing system 2200 to a transceiver adapted to transmit and receive signaling over the telecommunications network. FIG. 23 illustrates a block diagram of a transceiver 2300 adapted to transmit and receive signaling over a telecommunications network. The transceiver 2300 may be installed in a host device. As shown, the transceiver 2300 comprises a network-side interface 2302, a coupler 2304, a transmitter 2306, a receiver 2308, a signal processor 2310, and a device-side interface 2312. It is noted that coupler 2304 is typically present in a transceiver of a frequency division duplexed (FDD) communications system. In a time division duplexed (TDD) communications system, a switch would be present instead. The network-side interface 2302 may include any component or collection of components adapted to transmit or receive signaling over a wireless or wireline telecommunications network. The coupler 2304 may include any component or collection of components adapted to facilitate bi-directional communication over the network-side interface 2302. The transmitter 2306 may include any component or collection of components (e.g., up-converter, power amplifier, etc.) adapted to convert a baseband signal into a modulated carrier signal suitable for transmission over the network-side interface 2302. The receiver 2308 may include any component or collection of components (e.g., down-converter, low noise amplifier, etc.) adapted to convert a carrier signal received over the network-side interface 2302 into a baseband signal. The signal processor 2310 may include any component or collection of components adapted to convert a baseband signal into a data signal suitable for communication over the device-side interface(s) 2312, or vice-versa. The device-side interface(s) 2312 may include any component or collection of components adapted to communicate data-signals between the signal processor 2310 and components within the host device (e.g., the processing system 2200, local area network (LAN) ports, etc.).

The transceiver 2300 may transmit and receive signaling over any type of communications medium. In some embodiments, the transceiver 2300 transmits and receives signaling over a wireless medium. For example, the transceiver 2300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2302 comprises one or more antenna/radiating elements. For example, the network-side interface 2302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a beamforming unit/module, a determining unit/module, a rotating unit/module, and/or a repeating unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for transmitting beamformed signals, the method comprising:
    beamforming, by a transmit-receive point (TRP), a synchronization signal in accordance with a first set of spatially separated transmission beams, thereby producing first beamformed synchronization signals;
    beamforming, by the TRP, a broadcast signal in accordance with the first set of spatially separated transmission beams, thereby producing first beamformed broadcast signals;
    transmitting, by the TRP, the first beamformed synchronization signals;
    transmitting, by the TRP, the first beamformed broadcast signals;
    determining, by the TRP, if a first cycle is complete; and
    based on the first cycle not being complete,
        rotating, by the TRP, the first set of spatially separated transmission beams, and
        repeating, by the TRP, the beamformings, the transmittings, and the determining until the first cycle is complete.

2. The method of claim 1, wherein the first beamformed synchronization and broadcast signals oriented in different directions are transmitted in different subbands.

3. The method of claim 1, wherein the first beamformed broadcast signals oriented in different directions are transmitted with transmit diversity.

4. The method of claim 1, wherein the transmitting the first beamformed synchronization and broadcast signals comprises transmitting the first beamformed synchronization and broadcast signals for one of a symbol time, a time slot duration, or a subframe duration.

5. The method of claim 1, wherein the transmitting the first beamformed synchronization signals comprises transmitting the first beamformed synchronization signals using one sequence for all transmission beams in the first set of spatially separated transmission beams.

6. The method of claim 1, wherein the transmitting the first beamformed synchronization signals comprises transmitting the first beamformed synchronization signals using a different sequence for each transmission beam in the first set of spatially separated transmission beams.

7. A transmit-receive point (TRP) adapted to transmit beamformed control signals, the TRP comprising:
    a non-transitory memory storage comprising instructions; and
    a processor in communication with the non-transitory memory storage, wherein the processor executes the instructions to:
        beamform a synchronization signal in accordance with a first set of spatially separated transmission beams, thereby producing first beamformed synchronization signals,
        beamform a broadcast signal in accordance with the first set of spatially separated transmission beams for synchronization, thereby producing first beamformed broadcast signals,
        transmit the first beamformed synchronization signals,
        transmit the first beamformed broadcast signals,
        determine if a first cycle is complete, and
        based on the first cycle being not complete, rotate the first set of spatially separated transmission beams, and repeat the beamformings, the transmittings, and the determining until the first cycle is complete.

8. The TRP of claim 7, wherein the processor executes the instructions to:

beamform the synchronization signal in accordance with a second set of spatially separated transmission beams, thereby producing second beamformed synchronization signals, transmit the second beamformed synchronization signals;

determine if a second synchronization cycle is complete; and based on the second synchronization cycle not being complete, rotate the second set of spatially separated transmission beams, and repeat beamforming the synchronization signal in accordance with the second set of spatially separated transmission beams, transmitting the second beamformed synchronization signals, and determining if the second synchronization cycle is complete until the second synchronization cycle is complete.

9. The TRP of claim 7, wherein the processor executes the instructions to transmit the first beamformed synchronization and broadcast signals for one of a symbol time, a time slot duration, or a subframe duration.

10. The TRP of claim 7, wherein the first beamformed synchronization and broadcast signals oriented in different directions are transmitted in different subbands.

11. The TRP of claim 7, wherein the first beamformed broadcast signals oriented in different directions are transmitted with transmit diversity.

12. The TRP of claim 7, wherein the processor executes the instructions to transmit the first beamformed synchronization signals comprises the processor executes the instructions to transmit the first beamformed synchronization signals using one sequence for all transmission beams in the first set of spatially separated transmission beams.

13. The TRP of claim 7, wherein the processor executes the instructions to transmit the first beamformed synchronization signals comprises the processor executes the instructions to transmit the first beamformed synchronization signals using a different sequence for each transmission beam in the first set of spatially separated transmission beams.

* * * * *